United States Patent
Yokota et al.

(10) Patent No.: US 8,021,015 B2
(45) Date of Patent: Sep. 20, 2011

(54) CLIP AND ILLUMINANT DEVICE

(75) Inventors: Masashi Yokota, Suzuka (JP); Masaki Okazaki, Tsu (JP); Hiroki Fukai, Tsu (JP); Hideto Takeuchi, Kameyama (JP); Masaki Shimizu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 317 days.

(21) Appl. No.: 12/306,504

(22) PCT Filed: Jun. 25, 2007

(86) PCT No.: PCT/JP2007/062672
§ 371 (c)(1),
(2), (4) Date: Dec. 23, 2008

(87) PCT Pub. No.: WO2008/001710
PCT Pub. Date: Jan. 3, 2008

(65) Prior Publication Data
US 2009/0279320 A1    Nov. 12, 2009

(30) Foreign Application Priority Data

Jun. 26, 2006  (JP) ................. 2006-175405
Aug. 10, 2006  (JP) ................. 2006-218984
Jun. 19, 2007  (JP) ................. 2007-161813

(51) Int. Cl.
*F21S 4/00*      (2006.01)
*F21V 19/02*     (2006.01)

(52) U.S. Cl. ... 362/220; 362/238; 362/239; 362/249.08; 362/97.1

(58) Field of Classification Search ........ 362/97.1–97.4, 362/220, 238, 239, 249.08, 249.09, 225, 362/396, 418, 419, 436, 249.01, 249.07, 362/249.11, 632–634
See application file for complete search history.

(56) References Cited

U.S. PATENT DOCUMENTS

| | | | | |
|---|---|---|---|---|
| 7,434,958 B2* | 10/2008 | Yang et al. | | 362/225 |
| 2005/0162868 A1* | 7/2005 | Kim | | 362/632 |
| 2005/0225992 A1* | 10/2005 | Idei et al. | | 362/382 |
| 2005/0281037 A1* | 12/2005 | Murakami et al. | | 362/382 |
| 2006/0018130 A1* | 1/2006 | Lee | | 362/632 |
| 2006/0268542 A1* | 11/2006 | Chen et al. | | 362/225 |
| 2007/0091589 A1* | 4/2007 | Choi et al. | | 362/97 |
| 2007/0121318 A1* | 5/2007 | Nanbu | | 362/228 |
| 2008/0019152 A1* | 1/2008 | Aoki et al. | | 362/634 |
| 2008/0250684 A1 | 10/2008 | Park | | |
| 2009/0046445 A1* | 2/2009 | Namiki et al. | | 362/97.2 |

FOREIGN PATENT DOCUMENTS

| | | |
|---|---|---|
| JP | 3-87188 U | 9/1991 |
| JP | 06-075216 A | 3/1994 |
| JP | 2001-210126 A | 8/2001 |
| JP | 2004-327449 A | 11/2004 |
| JP | 2005-203154 A | 7/2005 |
| JP | 2006-147590 A | 6/2006 |
| KR | 2006-0036301 A | 4/2006 |

* cited by examiner

*Primary Examiner* — Anabel M Ton
*Assistant Examiner* — Danielle Allen
(74) *Attorney, Agent, or Firm* — Birch, Stewart, Kolasch & Birch, LLP

(57) ABSTRACT

A plurality of clipping portions which clip a plurality of lamps to be juxtaposed are provided on one face, and a mounting portion to be mounted on a supporting member by which the lamps are supported, and holding projecting portions for holding positions of the clipping portions with respect to the supporting member are provided, and two flexible portions which can bend in a direction in which a distance between the supporting sections is changed are provided between at least two clipping portions.

27 Claims, 25 Drawing Sheets

FIG. 3
(a)
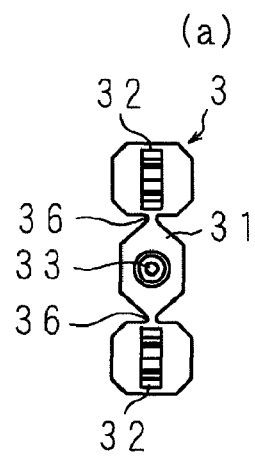
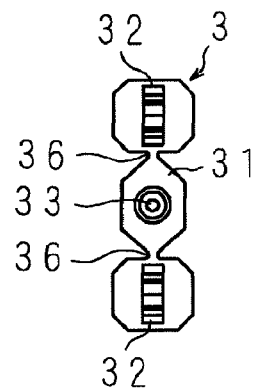
(b)
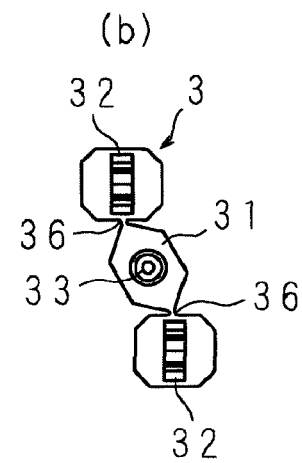
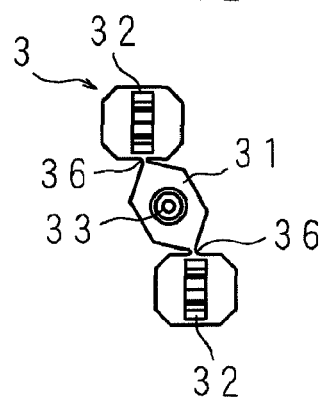
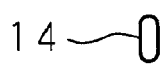
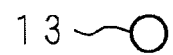
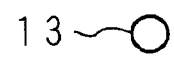
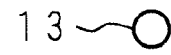
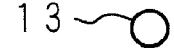
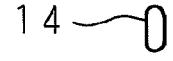

FIG. 8
(a)
(b)
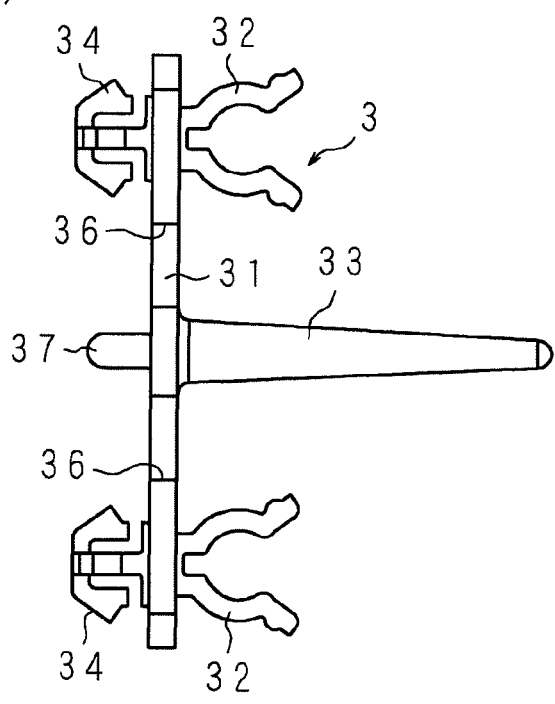
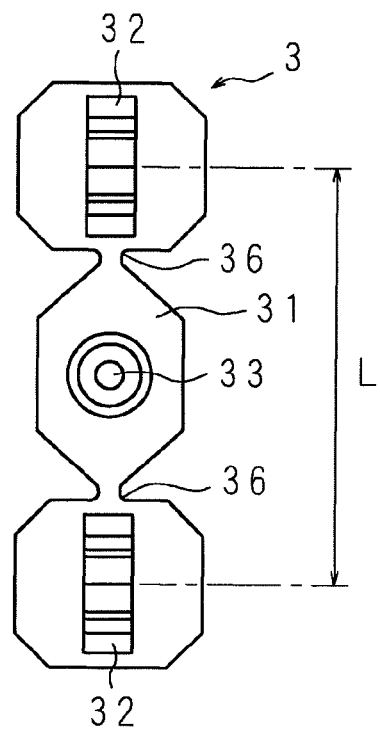
(c)
(d)
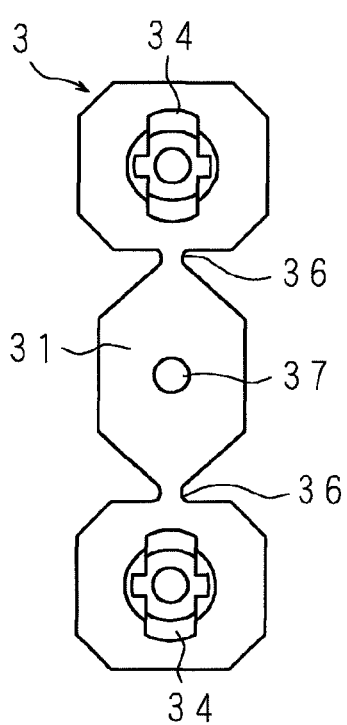
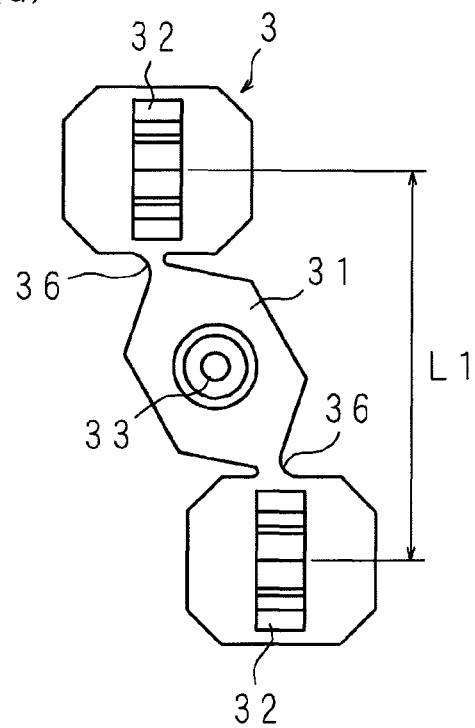

FIG. 9
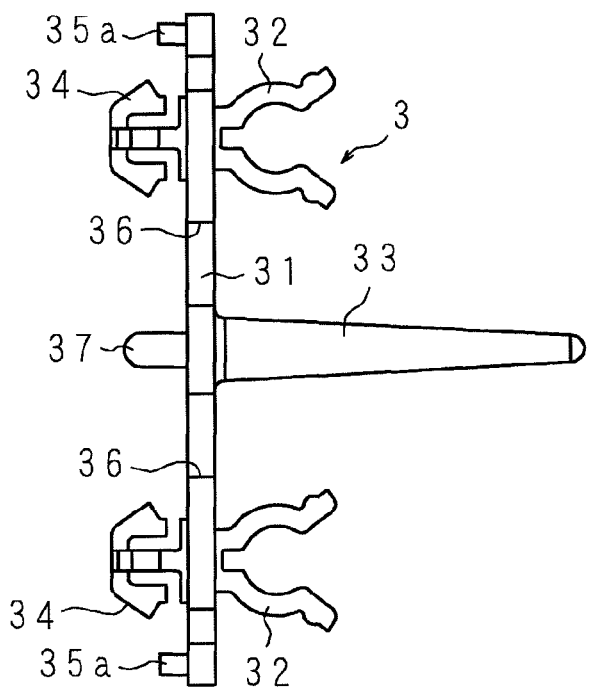
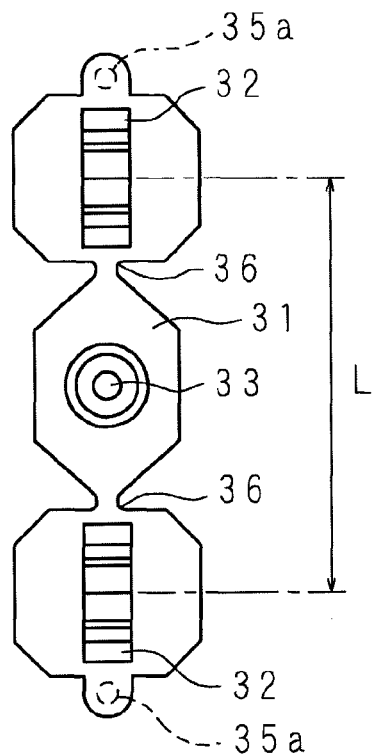
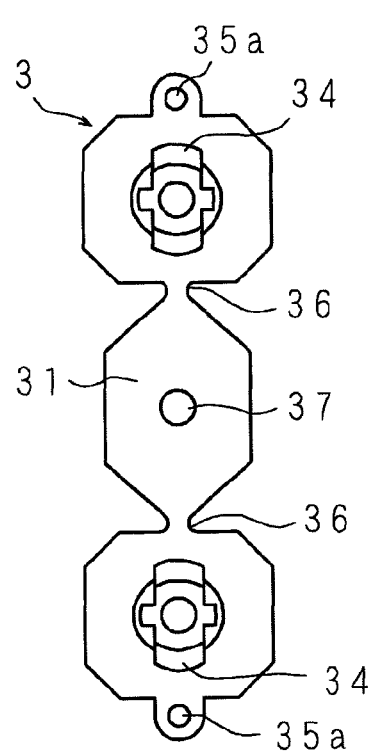
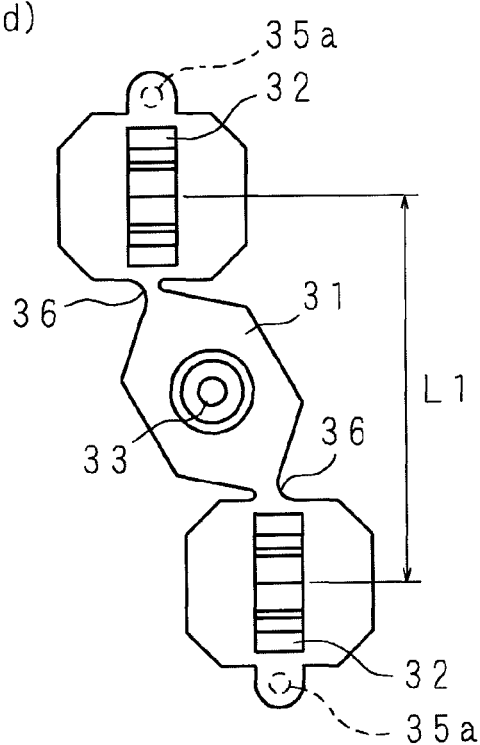

FIG. 10
(a)
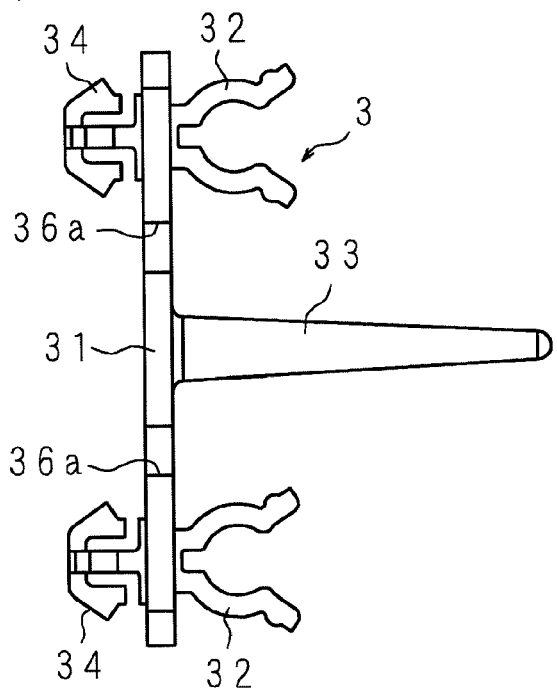
(b)
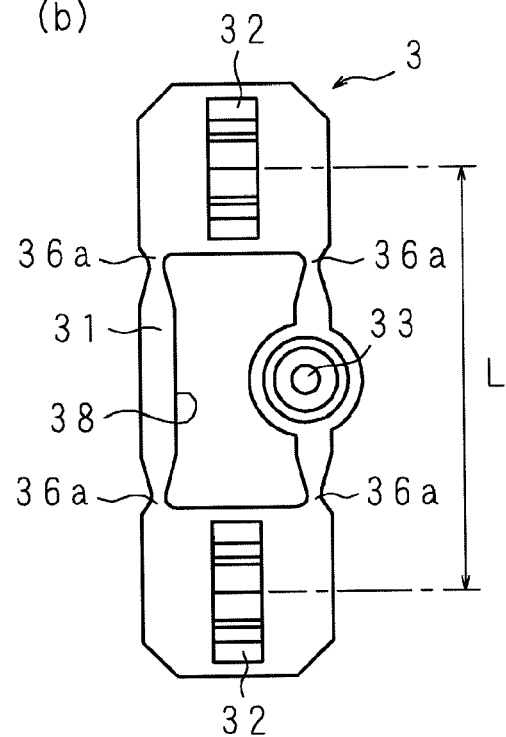
(c)
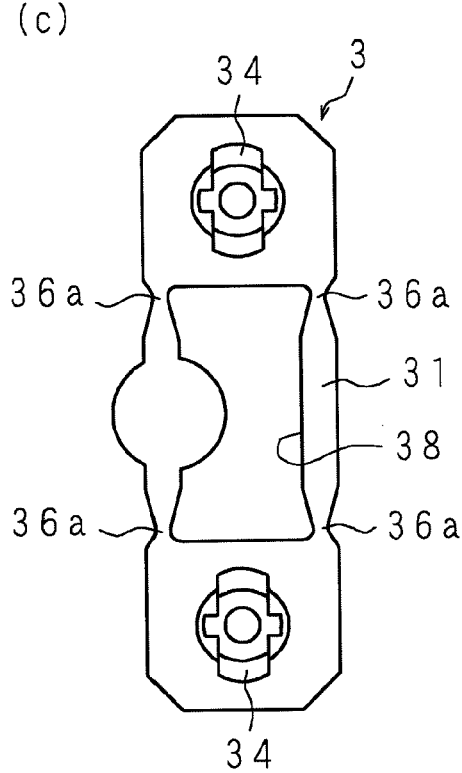
(d)
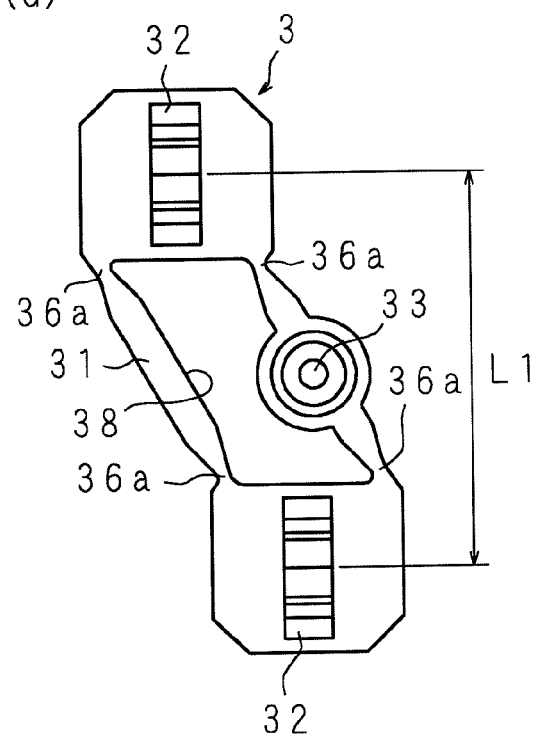

FIG. 11
(a)
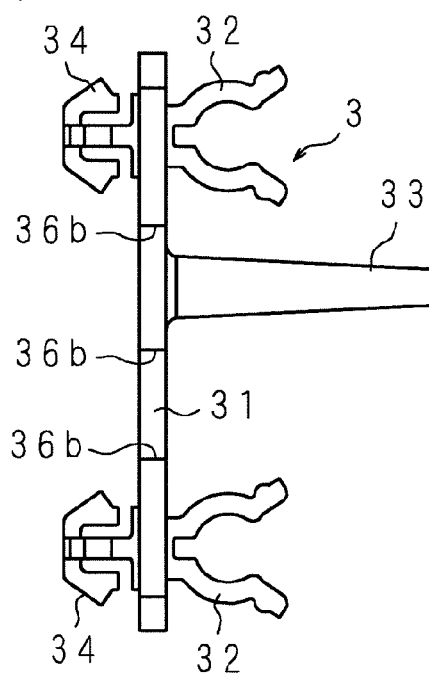
(b)
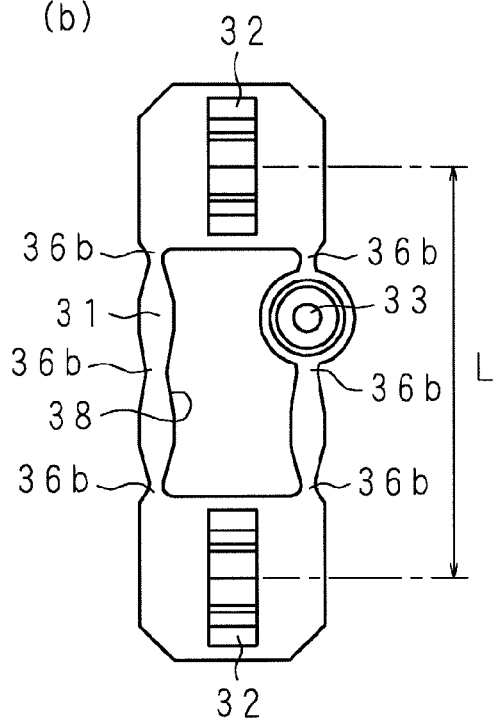
(c)
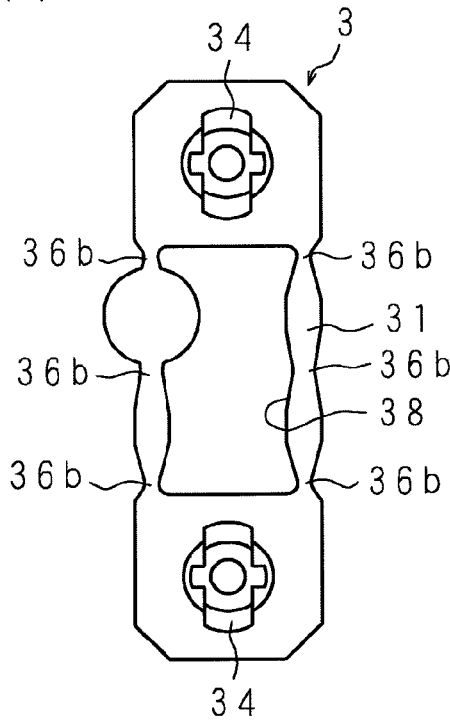
(d)
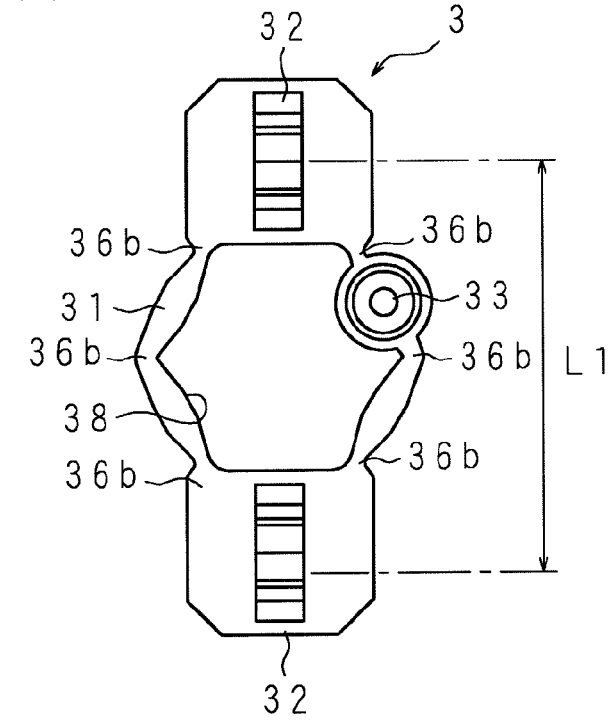

FIG. 23
(a)
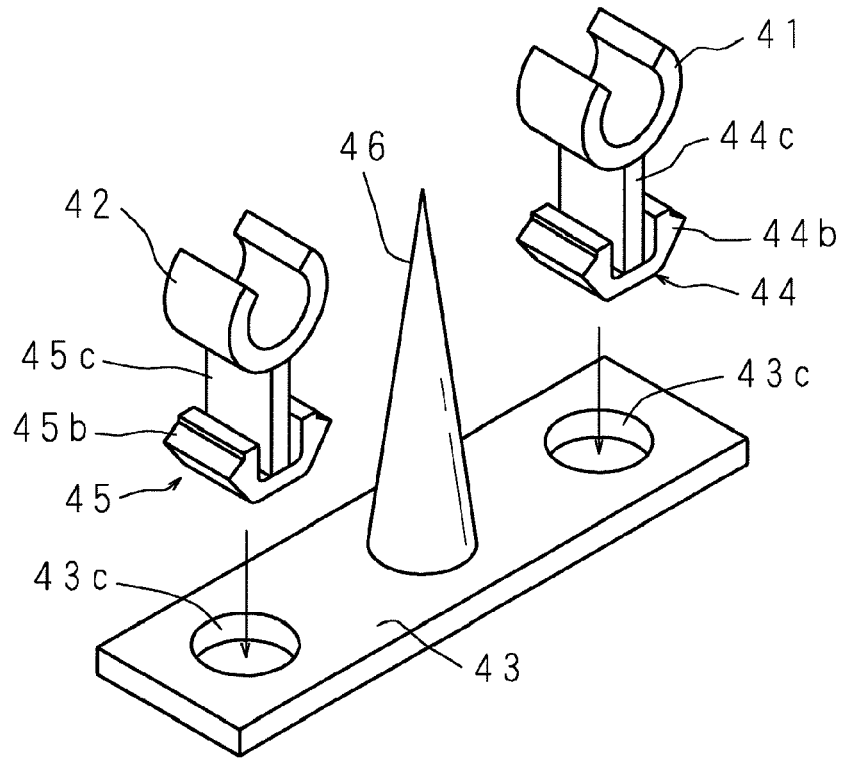
(b)
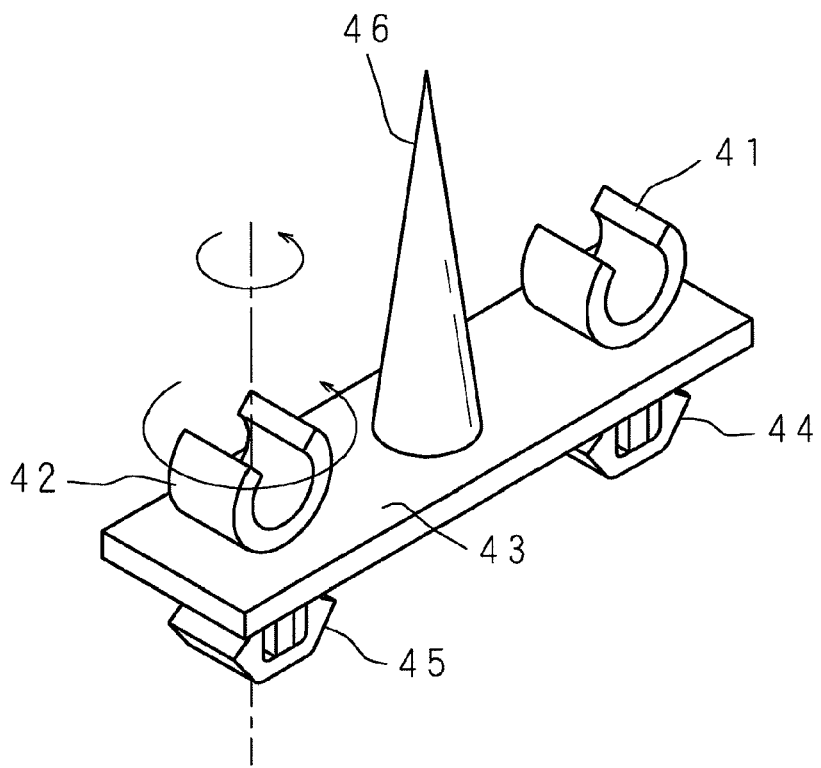

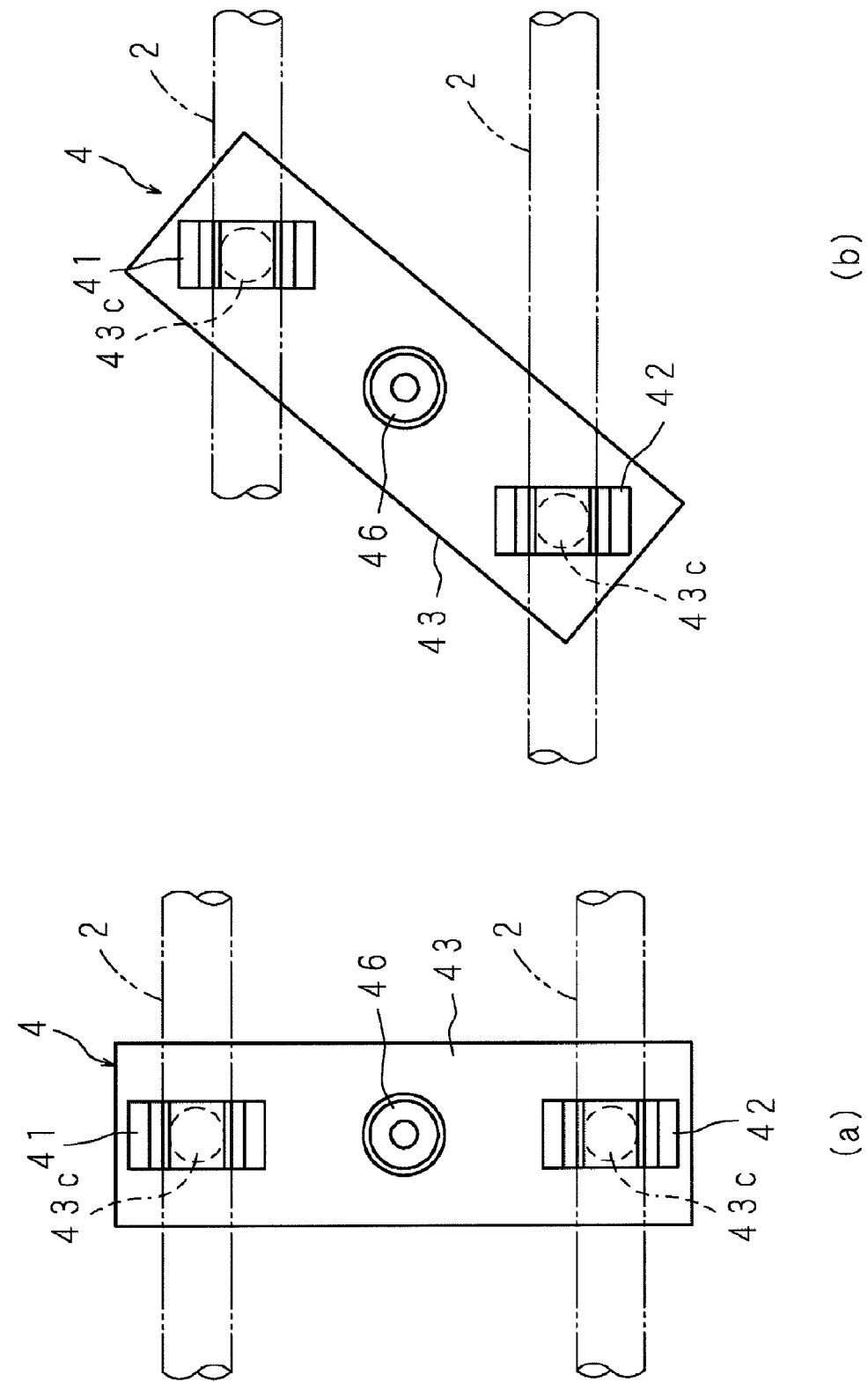

cription>
CLIP AND ILLUMINANT DEVICE

This application is the national phase under 35 U.S.C. §371 of PCT International Application No. PCT/JP2007/62672 which has an International filing date of Jun. 25, 2007 and designated the United States of America.

BACKGROUND OF THE INVENTION

1. Field of the Invention

The present invention relates to a clip which clips a rod-shaped lamp, and an illuminant device used as an illuminant of a display device such as a liquid crystal display.

2. Description of Related Art

In a display device such as television, the illuminant device is arranged on a back side of the display unit which has a display surface which displays an image on a front side thereof.

The illuminant device comprises a supporting member (housing) which has a plurality of lock holes in a back wall and is open on a front side, a plurality of rod-shaped lamps which are juxtaposed up and down at equal intervals in said supporting member, a holder which holds both ends of said lamps on said back wall, and a plurality of clips which hold intermediate parts of said lamps on said back wall (for example, refer to Japanese Patent Application Laid-Open No. 2001-210126).

The clips are constructed such that they have two locking portions which lock by being inserted and fitted in the lock holes of said back wall, two or more clipping portions in which intermediate parts of said two or more adjacent lamps are inserted and fitted, and a projection which projects between said two or more clipping portions and receives an intermediate part of an optical sheet in said display unit, and one clip holds intermediate parts of two or more adjacent lamps to said back wall.

By the way, in a display device such as television, there are several models in which sizes of display surfaces differ, and an illuminant device is formed corresponding to the model of display device. Hence, there are a plurality of models also in the illuminant devices, and juxtaposition intervals of the lamps differ among the models, and distances between the clipping portions of the clips also differ. Therefore, the clip is formed corresponding to the model of illuminant device, and there are a plurality of kinds of clips which differ in the distance between the clipping portions.

Since the size of a display device such as television tends to increase, and the length of a rod-shaped lamp of the illuminant device also increases with increase in the size of a display device, the illuminant device described in Japanese Patent Application Laid-Open No. 2001-210126 is constructed such that the lamps can be protected and juxtaposition precision of the lamps can be maintained by using a clip which clips a central part in a longitudinal direction of the lamp and mounting said clip on the supporting member. Said clips has a first clip which includes two first clipping portions that clip intermediate parts of two adjacent lamps and a first mounting portion to be mounted on said supporting member, a second clip which includes a second clipping portion that clips an intermediate part of one lamp and a second mounting portion to be mounted to said supporting member, and a first mount hole corresponding to said first mounting portion and a second mount hole corresponding to said second mounting portion are perforated to said supporting member.

As a construction example of the illuminant device, there is a construction which includes a supporting member which is open on a front side, a plurality of rod-shaped lamps which are juxtaposed up and down at different intervals in said supporting member, and a holder which holds both ends of said lamp inside said supporting member (for example, refer to Japanese Patent Application Laid-Open No. 06-75216 (1994)). Said lamps are constructed such that, by narrowing juxtaposition intervals at central parts upward and downward, and increasing juxtaposition intervals on an upper side and lower side, lamp luminance in the central part of said display surface is made the highest, lamp luminance is gradually reduced as it goes to the upper and lower ends of said display surface, thereby reducing the number of the lamps.

By the way, in the illuminant device described in Japanese Patent Application Laid-Open No. 06-75216 (1994), when supporting the central part of the lamp using the clip described in Japanese Patent Application Laid-Open No. 2001-210126, the following two methods can be considered.

(1) to arrange the second clip staggeredly in the juxtaposition direction of the lamps (2) to arrange staggeredly a plurality of kinds of the first clips which differ in the distance between the two first clipping portions, in the juxtaposition direction of the lamps

SUMMARY OF THE INVENTION

However, in a case of the above (1), since two or more lamps cannot be clipped at once, there is a problem that the number of the second clips with respect to the number of the lamps increases, and the install workability of the clips deteriorates.

In a case of the above (2), there is a problem that a molding tool is required for each of a plurality of kinds of the first clips corresponding to juxtaposition intervals of the lamps, and a manufacturing cost of the clip including depreciation of the molding tool and accordingly, a cost of the illuminant device increase.

Since a plurality of kinds of clips are formed according to a model of the illuminant device as mentioned above, the molding tool is required for each kind of clip, and the manufacturing cost of the clip including depreciation of the molding tool and accordingly, the cost of the clip, and the cost of the illuminant device increase, and hence a remedy is required.

The present invention is made in view of these circumstances, and the main object is to provide a clip capable of clipping, as a common clip, a plurality of rod-shaped lamps which are juxtaposed, even in an illuminant device in which juxtaposition intervals of the lamps differ, by providing position changing means capable of changing a relative position of at least two clipping portions which clip the lamps.

Another object is to provide a clip capable of clipping the lamps as a common clip, even in an illuminant device in which juxtaposition intervals of the lamps differ, by providing distance changing means capable of changing a distance between at least two of said clipping portions in a direction in which said lamps are juxtaposed.

Furthermore, another object is to provide a clip capable of clipping, as a common clip, a plurality of rod-shaped lamps which are juxtaposed, even in an illuminant device in which juxtaposition intervals of the lamps differ, and capable of reducing uneven brightness due to the clip of the illuminant device, by providing a flexible portion between at least two of said clipping portions which clip the lamps.

Furthermore, another object is to provide a clip capable of displacing at least two clipping portions in a longitudinal direction of the lamp, and capable of further reducing uneven brightness due to the clip of the illuminant device, by enabling the flexible portion to bend in a direction in which a distance between said clipping portions is changed.

Furthermore, another object is to provide a clip capable of clipping the lamp without applying bending load on the lamp, by arranging a plurality of said flexible portions between said clipping portions.

Furthermore, another object is to provide a clip capable of clipping, as a common clip, a plurality of lamps which are juxtaposed, even in an illuminant device in which juxtaposition intervals of the lamps differ, and capable of reducing uneven brightness due to the clip of the illuminant device, by providing a through hole between at least two of said clipping portions which clip the lamps and providing a flexible portion on both sides of the through hole.

Furthermore, another object is to provide a clip capable of further stabilizing clipped posture of the lamps, by providing a holding projecting portion for holding positions of said clipping portions with respect to said supporting member at a position spaced from the flexible portion toward the clipping portion.

Furthermore, another object is to provide a clip capable of reducing the number of mounting portion to one and capable of reducing the cost by arranging the mounting portion between the plurality of flexible portions.

Furthermore, another object is to provide a clip capable of maintaining an uprising state of a columnar projection without being influenced by the flexible portions by providing the columnar projection which extends outward exceeding said clipping portions between said flexible portions.

Furthermore, another object is to provide a clip capable of stabilizing, as a common clip, clipped posture of a plurality of lamps which are juxtaposed, even in an illuminant device in which juxtaposition intervals of the lamps differ, by providing a groove portion on the one face between at least two of the clipping portions which clip the lamps and two groove portions on the other face on both sides of said one groove portion.

Furthermore, another object is to provide a clip capable of clipping, as a common clip, two rod-shaped lamps which are juxtaposed, even in an illuminant device in which juxtaposition intervals of the lamps differ, by enabling at least one of two clipping portions which clip two lamps to move.

Furthermore, another object is to provide a clip capable of improving clipping workability of the lamps by enabling said movable clipping portion to slide in a direction in which a distance between the clipping portions is changed.

Furthermore, another object is to provide a clip capable of clipping the lamps without applying bending load on the lamps by providing a regulating portion which regulates rotation in a direction crossing a direction in which said movable clipping portion slides.

Furthermore, another object is to provide a clip capable of adjusting positions of two clipping portions so as to be in parallel with the lamps, and capable of improving clipping workability of the lamps whose juxtaposition intervals differ by juxtaposing a plurality of said movable clipping portions rotatably.

Furthermore, another object is to provide an illuminant device capable of clipping, as a common clip, a plurality of lamps which are juxtaposed can be clipped, even in an illuminant device in which juxtaposition intervals of the lamps differ, and capable of reducing uneven brightness due to the clip of the illuminant device, by providing the lamps, a supporting member by which the lamps are supported and a clip defined in the above mentioned invention.

Furthermore, another object is to provide an illuminant device capable of clipping easily the lamps whose juxtaposition intervals differ without adjusting a distance between two clipping portions in a juxtaposition direction in which said lamps are juxtaposed, by providing in the supporting member a plurality of first mount holes at positions in the juxtaposition direction and a plurality of second mount holes at positions inclined with respect to said juxtaposition direction, and providing in the clip a mounting portion which is inserted and fitted in said mount hole.

Furthermore, another object is to provide an illuminant device capable of clipping, as a common clip, the lamps which are juxtaposed, even in an illuminant device in which juxtaposition intervals of the lamps differ, by providing in the clip distance changing means capable of changing a distance between at least two of said clipping portions corresponding to a juxtaposition interval of the lamps.

A clip according to the present invention is a clip having a plurality of clipping portions which clip a plurality of rod-shaped lamps to be juxtaposed, characterized by comprising position changing means capable of changing a relative position of at least two of said clipping portions.

In the present invention, since a relative position of two clipping portions can be changed by the position changing means, the lamps can be clipped with a common clip even in an illuminant device in which juxtaposition intervals of the lamps differ, and thereby the number of kinds of the clips can be reduced with respect to the models of the illuminant device.

Furthermore, a clip according to the present invention is a clip having a plurality of clipping portions which clip a plurality of rod-shaped lamps to be juxtaposed, characterized by comprising distance changing means capable of changing a distance between at least two of said clipping portions in a direction in which said lamps are juxtaposed.

In the present invention, since a distance between two clipping portions can be changed by the distance changing means, the lamps can be clipped with a common clip even in an illuminant device in which juxtaposition intervals of the lamps differ, and thereby the number of kinds of the clips can be reduced with respect to the models of the illuminant device.

Furthermore, a clip according to the present invention is a clip having a plurality of clipping portions which clip a plurality of rod-shaped lamps to be juxtaposed, characterized by comprising a flexible portion provided between at least two of said clipping portions.

In the present invention, since a distance between two clipping portions can be changed by bending of the flexible portion, the lamps can be clipped with a common clip even in an illuminant device in which juxtaposition intervals of the lamps differ, and thereby the number of kinds of the clips can be reduced with respect to the models of the illuminant device. Therefore, the cost of the clips can be reduced and it is easy to manage the clips.

Moreover, since the flexible portion is formed so as to be thin-walled to the extent that a distance between two clipping portions can be changed, heat capacity by which heat is absorbed from the lamp to the clip can be reduced. Therefore at an early stage of lighting of the lamp, time required for temperature of the lamp to attain a steady state can be shortened, and occurrence time of uneven brightness can be shortened, and thereby display quality can be improved. And also, since the clip can be molded integrally, the material cost can be reduced and the whole cost can be further reduced.

Furthermore, a clip according to the present invention is characterized in that said flexible portion is capable of bending in a direction in which a distance between said clipping portions is changed.

In the present invention, since a plurality of the clipping portions can be displaced in the longitudinal direction of the lamp when a distance between the clipping portions is changed by bending of the flexible portion and the clipping portions of the adjacent lamps do not align up and down, uneven brightness due to the clip of the illuminant device can be further decreased.

Furthermore, a clip according to the present invention is characterized in that a plurality of said flexible portions are arranged between said clipping portions.

In the present invention, since the plurality of flexible portions can be arranged in parallel by bending of the plurality of flexible portions, the lamps can be clipped without applying bending load on the lamps.

Furthermore, a clip according to the present invention is a clip having a plurality of clipping portions which clip a plurality of rod-shaped lamps to be juxtaposed, characterized by comprising: a through hole provided between at least two of said clipping portions; and a flexible portion provided between the through hole and one of the clipping portions and capable of bending in a direction in which a distance between the clipping portions is changed.

In the present invention, since a distance between the plurality of clipping portions can be changed by bending of the flexible portions, the lamps can be clipped with a common clip even in an illuminant device in which juxtaposition intervals of the lamps differ, and the number of kinds of the clips can be reduced with respect to the models of the illuminant device. Therefore the cost of the clip can be reduced and it is easy to manage the clips. Moreover, since a plurality of the clipping portions can be displaced in the longitudinal direction of the lamp and the clipping portions of the adjacent lamps do not align up and down when a distance between the plurality of clipping portions is changed by bending of the flexible portion, uneven brightness due to the clip of the illuminant device can be further decreased.

Moreover, since the flexible portion is formed of the through hole and heat capacity by which heat is absorbed from the lamp to the clip can be reduced, at an early stage of lighting of the lamp, time required for temperature of the lamp to attain a steady state can be shortened, and occurrence time of uneven brightness can be shortened, and thereby display quality can be improved. And also, the material cost of the clip can be reduced and the whole cost can be further reduced.

Furthermore, a clip according to the present invention is a clip having on one face a plurality of clipping portions which clip a plurality of rod-shaped lamps to be juxtaposed, and on the other face a mounting portion to be mounted on a supporting member by which the lamps are supported, characterized by comprising: a flexible portion provided between at least two of said clipping portions and capable of bending in a direction in which a distance between the clipping portions is changed; and a holding projecting portion provided at a position spaced from the flexible portion to said clipping portions side, for holding positions of said clipping portions with respect to said supporting member.

In the present invention, by inserting and fitting the holding projecting portion in the hole provided in the supporting member, positions of the clipping portions with respect to the supporting member can be maintained and clipped posture of the lamps can be further stabilized.

Furthermore, a clip according to the present invention is characterized in that a plurality of said flexible portions are arranged between said clipping portions, and said mounting portion is arranged between the flexible portions.

In the present invention, while maintaining positions of a plurality of clipping portions with respect to the supporting member, the number of the mounting portion can be reduced to one, and the cost can be reduced.

Furthermore, a clip according to the present invention is characterized by further comprising a columnar projection which extends outward exceeding said clipping portions between said flexible portions.

In the present invention, since an uprising state of the columnar projection can be maintained without being influenced by the flexible portion, an optical sheet in the display device can be received properly.

Furthermore, a clip according to the present invention is a clip having on one face a plurality of clipping portions which clip a plurality of rod-shaped lamps to be juxtaposed, and on the other face a mounting portion to be mounted on a supporting member by which the lamps are supported, characterized by comprising: two groove portions provided on said other face between at least two of the clipping portions; and a groove portion provided on said one face between the two groove portions.

In the present invention, since the plurality of clipping portions can be displaced in parallel with the lamps by bending of the flexible groove portions, even in an illuminant device in which juxtaposition intervals of the lamps differ, clipped posture of the lamps can be stabilized with a common clip.

Furthermore, a clip according to the present invention is a clip having a plurality of clipping portions which clip a plurality of rod-shaped lamps to be juxtaposed, characterized in that at least one of the clipping portions is movable.

In the present invention, since a distance between the plurality of clipping portions can be changed by enabling the clipping portion to move, even in an illuminant device in which juxtaposition intervals of the lamps differ, the lamps can be clipped with a common clip, and the number of kinds of the clips can be reduced with respect to the lamps whose juxtaposition intervals differ. Therefore the cost of the clip can be reduced and it is easy to manage the clips.

Furthermore, a clip according to the present invention is characterized in that said movable clipping portion is capable of sliding in a direction in which a distance between the clipping portions is changed.

In the present invention, since a distance between the plurality of clipping portions can be changed easily by carrying out the sliding operation of the clipping portion, the clipping workability of the lamp can be improved.

Furthermore, a clip according to the present invention is characterized by comprising a regulating portion which regulates rotation in a direction crossing a direction in which said movable clipping portion slides.

In the present invention, since the movable clipping portion can be slid in parallel with the lamp, the lamp can be clipped without applying bending load on the lamp.

Furthermore, a clip according to the present invention is characterized in that a plurality of said movable clipping portions are juxtaposed rotatably.

In the present invention, by arranging the clip at a position in the juxtaposition direction of the lamp, a distance in the juxtaposition direction between two clipping portions can be lengthened, and by arranging the clip at a position inclined with respect to the juxtaposition direction, a distance in the juxtaposition direction between two clipping portions can be shortened. Moreover, by rotating two clipping portions, positions of the two clipping portions can be adjusted so as to be in parallel with the lamp. Therefore the clipping workability of the lamp whose juxtaposition intervals differ can be improved.

Furthermore, an illuminant device according to the present invention is an illuminant device characterized by comprising: a plurality of lamps which are Juxtaposed; a supporting member by which the lamps are supported; and a clip defined in the above mentioned invention.

In the present invention, even in an illuminant device in which juxtaposition intervals of the lamps differ, the lamps can be clipped with a common clip, and thereby the number of kinds of the clips can be reduced with respect to the models of the illuminant device. Therefore the cost of the illuminant device provided with the clip can be reduced, and it is easy to manage the clips of the illuminant device.

Furthermore, an illuminant device according to the present invention is characterized in that said supporting member has a plurality of first mount holes provided at positions in a juxtaposition direction in which said lamps are juxtaposed, and a plurality of second mount holes provided at positions inclined with respect to said juxtaposition direction, and said clip has a mounting portion which is inserted and fitted in one of said mount holes.

In the present invention, by inserting and fitting the mounting portion of the clip in the first mount hole, a distance between the clipping portions in the juxtaposition direction can be lengthened, and by inserting and fitting the mounting portion of the clip in the second mount hole, a distance between the clipping portions in the juxtaposition direction can be shortened. Therefore, the lamps whose juxtaposition intervals differ can be clipped easily, without adjusting a distance between the clipping portions in the juxtaposition direction.

Furthermore, an illuminant device according to the present invention is an illuminant device comprising a plurality of lamps which are juxtaposed, a supporting member by which the lamps are supported, and a clip having a plurality of clipping portions which clip intermediate parts of the lamps, characterized in that said clip has distance changing means capable of changing a distance between at least two of said clipping portions corresponding to a juxtaposition interval of said lamps which are juxtaposed.

In the present invention, since a distance between the clipping portions can be changed by the distance changing means, the lamps can be clipped with a common clip even in an illuminant device in which juxtaposition intervals of the lamps differ, and the number of kinds of the clips can be reduced with respect to the models of the illuminant device.

According to the present invention, even in an illuminant device in which juxtaposition intervals of the lamps differ, since the lamps can be clipped with a common clip, the number of kinds of the clips can be reduced with respect to the models of the illuminant device, and the cost of the clip can be reduced, and it is easy to manage the clips.

Moreover, since heat capacity by which heat is absorbed from the lamp to the clip can be reduced, at an early stage of lighting of the lamp, time required for temperature of the lamp to attain a steady state can be shortened, and occurrence time of uneven brightness can be shortened, and thereby display quality can be improved. And also, the material cost of the clip can be reduced and the whole cost can be further reduced.

Furthermore, according to the present invention, since a plurality of the clipping portions can be displaced in the longitudinal direction of the lamp by bending of the flexible portion and the clipping portions of the adjacent lamps do not align up and down, uneven brightness due to the clip of the illuminant device can be further decreased.

Furthermore, according to the present invention, since the plurality of clipping portions can be arranged in parallel by bending of the plurality of flexible portions, the lamp can be clipped without applying bending load on the lamp.

Furthermore, according to the present invention, since the flexible portion is formed by providing the through hole, heat capacity by which heat is absorbed from the lamp to the clip can be reduced and uneven brightness due to the clip of the illuminant device can be further reduced, and also, the material cost of the clip can be reduced and the whole cost can be further reduced.

Furthermore, according to the present invention, since the holding projecting portion is inserted and fitted in the hole provided in the supporting member, positions of the plurality of clipping portions with respect to the supporting member can be held, and clipped posture of the lamp can be further stabilized.

Furthermore, according to the present invention, since the mounting portion is arranged between the plurality of flexible portions, the number of the mounting portion can be reduced to one and the cost can be reduced even for holding positions of the plurality of clipping portions with respect to the supporting member.

Furthermore, according to the present invention, since an uprising state of the columnar projection can be maintained without being influenced by the flexible portion, an optical sheet in the display device can be received properly.

Furthermore, according to the present invention, since the groove portions are provided on the one face and the other face, two clipping portions can be displaced in parallel with the lamp, and clipped posture of the lamp can be further stabilized.

Furthermore, according to the present invention, even in an illuminant device in which juxtaposition intervals of the lamps differ, since the lamps can be clipped with a common clip, the number of kinds of the clips can be reduced with respect to the models of the illuminant device. Therefore the cost of the clips can be reduced and it is easy to manage the clips. Moreover, since a plurality of the clipping portions can be displaced in the longitudinal direction of the lamp and the clipping portions of the adjacent lamps do not align up and down when a distance between the clipping portions is changed by bending of the flexible portion, uneven brightness due to the clip of the illuminant device can be further decreased.

Moreover, since the flexible portion is formed so as to be thin-walled to the extent that a distance between the clipping portions can be changed, heat capacity by which heat is absorbed from the lamp to the clip can be reduced. Therefore, at an early stage of lighting of the lamp, time required for temperature of the lamp to attain a steady state can be shortened, and occurrence time of uneven brightness can be shortened, and thereby display quality can be improved. And also, the material cost of the clip can be reduced and the whole cost can be further reduced.

Furthermore, according to the present invention, since a distance between the clipping portions can be changed easily by carrying out the sliding operation of the clipping portions, the clipping workability of the lamp can be improved.

Furthermore, according to the present invention, since the movable clipping portion can be slid in parallel with the lamp, the lamp can be clipped without applying bending load on the lamp.

Furthermore, according to the present invention, since positions of the plurality of clipping portions can be adjusted so as to be in parallel with the lamp, the clipping workability of the lamps whose juxtaposition intervals differ can be improved.

Furthermore, according to the present invention, even in an illuminant device in which juxtaposition intervals of the lamps differ, since the lamps can be clipped with a common clip, the number of kinds of the clips can be reduced with respect to the lamps whose juxtaposition intervals differ and the cost of the illuminant device can be reduced.

Furthermore, according to the present invention, the lamps whose juxtaposition intervals differ can be clipped easily, without adjusting a distance between two clipping portions in the juxtaposition direction.

The above and further objects and features will more fully be apparent from the following detailed description with accompanying drawings.

BRIEF DESCRIPTION OF THE DRAWINGS

FIG. 3 is an explanatory view showing a relationship of the clip and a supporting member according to the present invention.

FIG. 8 is a view showing another construction of the clip according to the present invention, in which (a) is a front view; (b) is a right side view, (c) is a left side view, and (d) is a right side view showing a state where a distance between the clipping portions is shortened.

FIG. 9 is a view showing another construction of the clip according to the present invention, in which (a) is a front view, (b) is a right side view, (c) is a left side view, and (d) is a right side view showing a state where a distance between the clipping portions is shortened.

FIG. 10 is a view showing another construction of the clip according to the present invention, in which (a) is a front view, (b) is a right side view, (c) is a left side view, and (d) is a right side view showing a state where a distance between the clipping portions is shortened.

FIG. 11 is a view showing another construction of the clip according to the present invention, in which (a) is a front view, (b) is a right side view, (c) is a left side view, and (d) is a right side view showing a state where a distance between the clipping portions is shortened.

FIG. 23 is a view showing another construction of the clip according to the present invention, in which (a) is an exploded perspective view, and (b) is a perspective view in a installed state.

FIG. 25 is an explanatory view showing a relationship of the clip and the lamp according to the present invention.

DETAILED DESCRIPTION OF THE INVENTION

Figure 1:
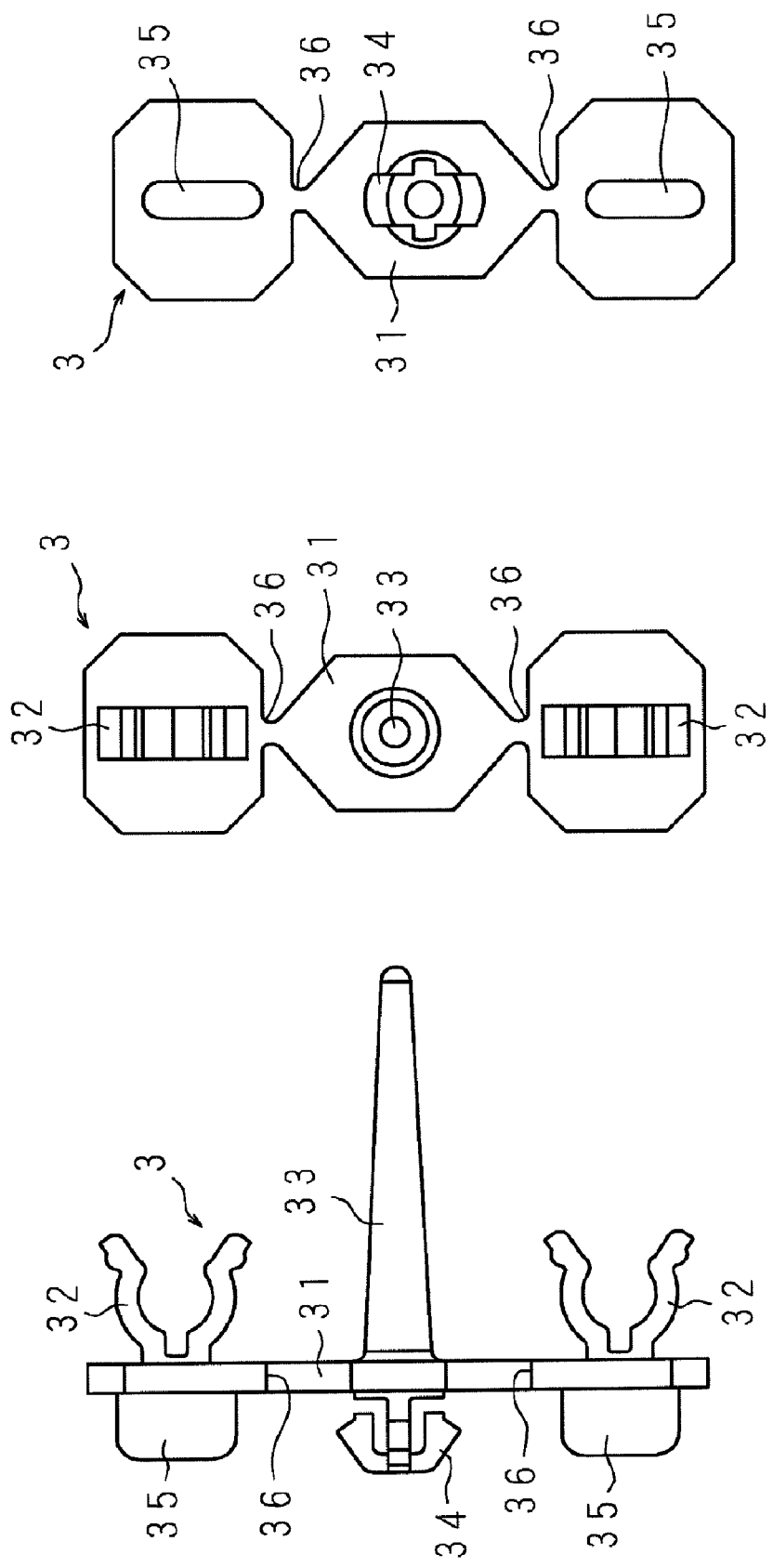
FIG. 1 is a view showing a construction of a clip according to the present invention, in which (a) is a front view, (b) is a right side view and (c) is a left side view.
Figure 2:
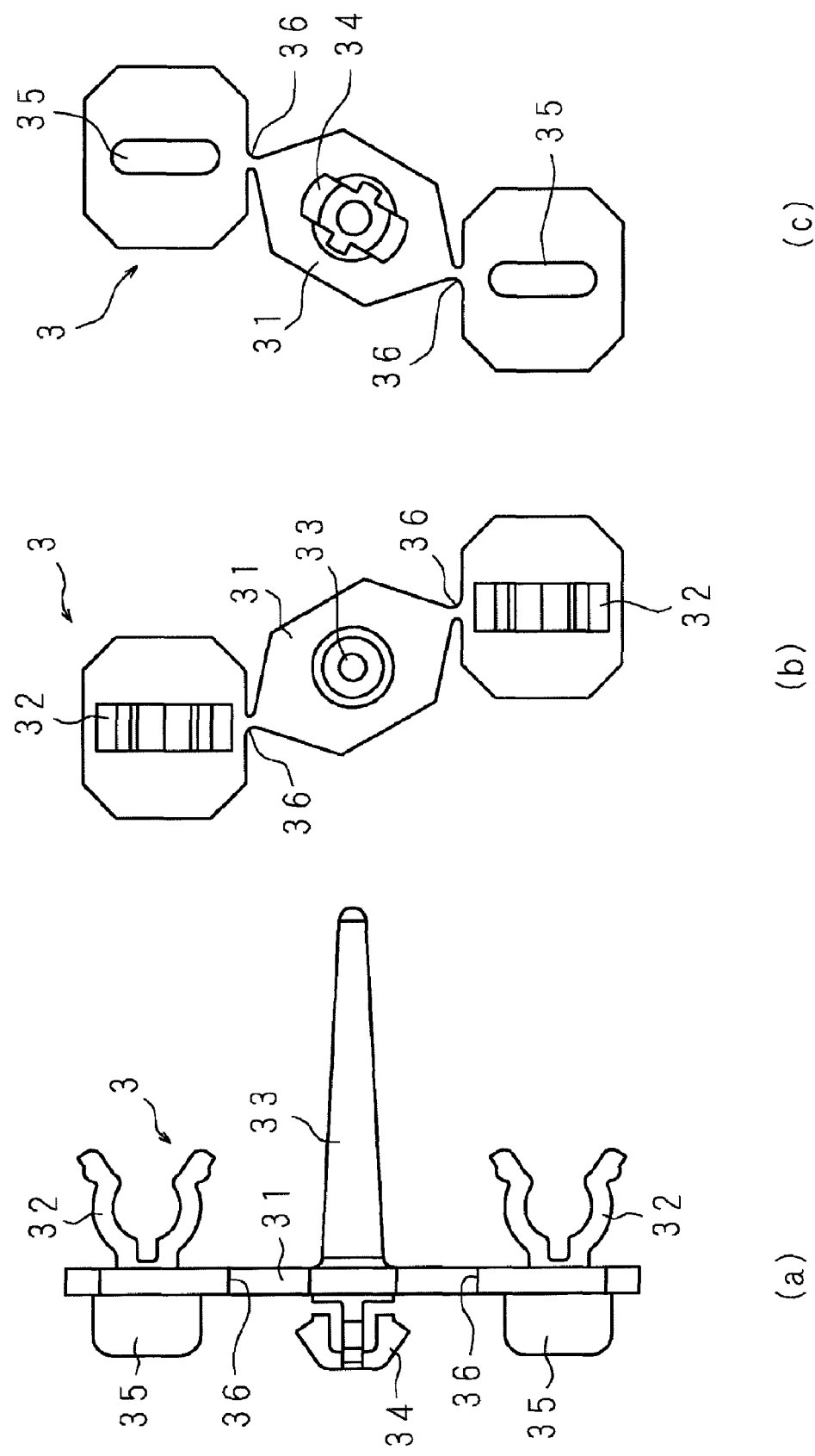
FIG. 2 is a view showing a state where a distance between clipping portions of the clip according to the present invention is shortened, in which (a) is a front view, (b) is a right side view and (c) is a left side view.
Figure 4:
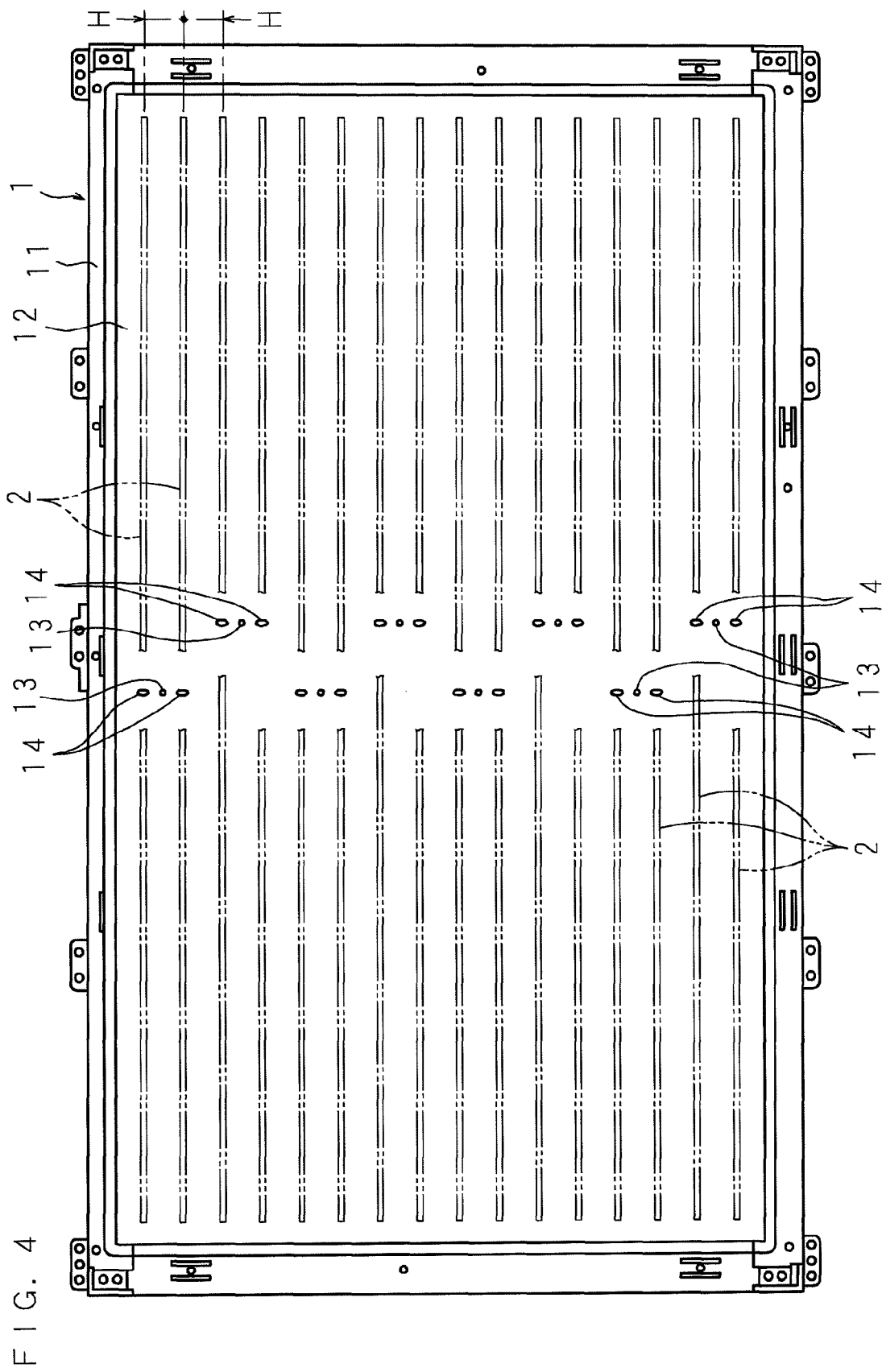
FIG. 4 is a front view showing a construction of an illuminant device provided with the supporting member which supports lamps whose juxtaposition intervals H are large.
Figure 6:
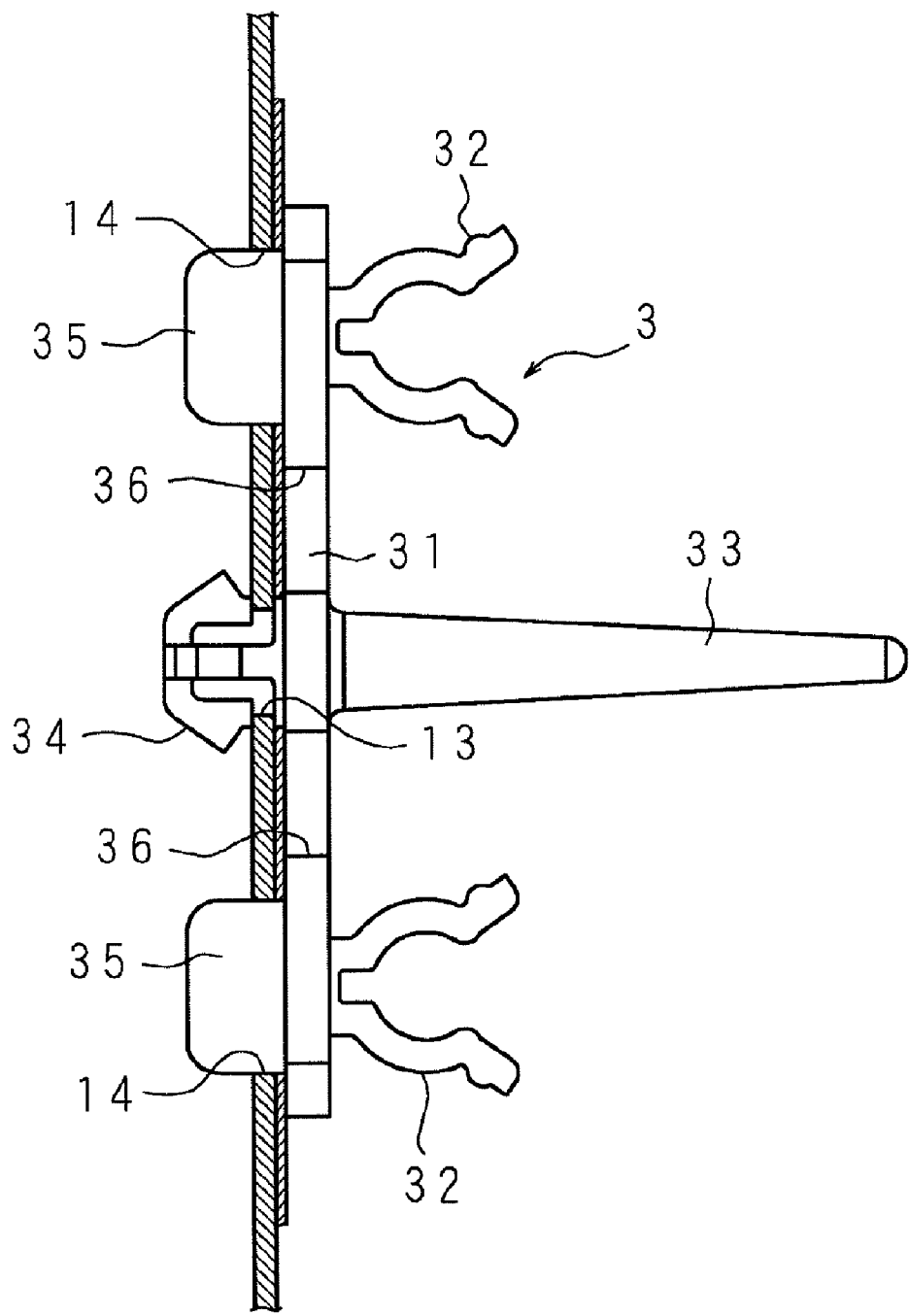
FIG. 6 is an expanded sectional view showing a state where the clip according to the present invention is mounted on the supporting member.
Figure 7:
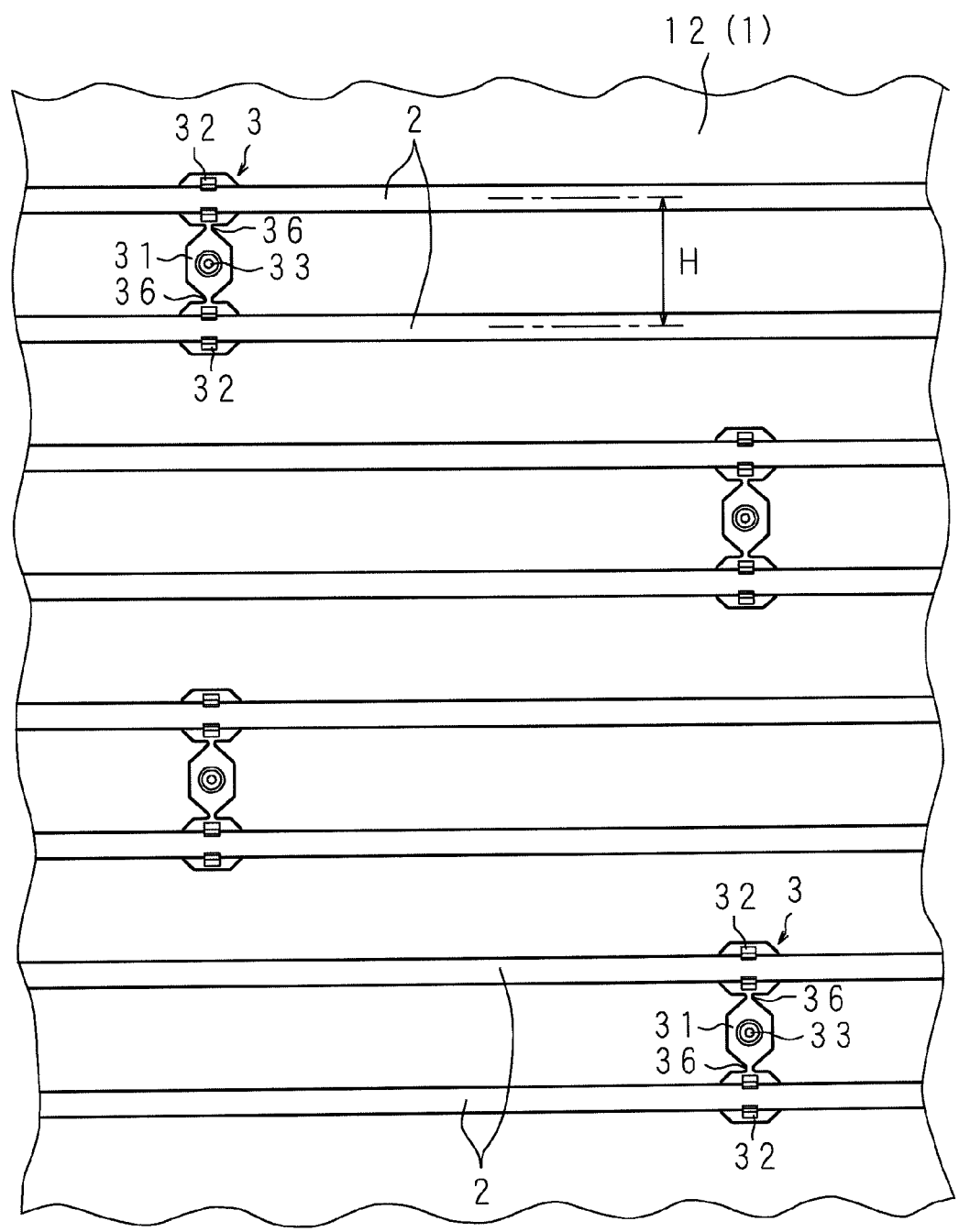
FIG. 7 is a front view showing a state where the clip according to the present invention holds a lamp to the supporting member.

In the following, the present invention is detailed based upon drawings showing embodiments thereof. FIG. 1 shows a construction of a clip according to the present invention, in which (a) is a front view, (b) is a right side view, and (c) is a left side view. FIG. 2 shows a state where a distance between clipping portions is shortened, in which (a) is a front view, (b) is a right side view, and (c) is a left side view. FIG. 3 is an explanatory view showing a relationship between the clip and a supporting member, FIG. 4 is a front view showing a construction of an illuminant device provided with the supporting member which supports lamps whose juxtaposition intervals are large, FIG. 5. is a front view showing a construction of the illuminant device provided with the supporting member which supports lamps whose juxtaposition intervals are narrow, FIG. 6 is an expanded sectional view showing a state where the clip is mounted on the supporting member, and FIG. 7 is a front view showing a state where the clip holds the lamp to the supporting member.

The illustrated illuminant device comprises a box-shaped supporting member 1 which is open on a front side thereof and includes a frame portion 11 having a rectangular parallelepiped shape and a back wall 12 an edge portion of which is joined to the flame portion 11 and which closes a back side end of said frame portion 11, a plurality of rod-shaped lamps 2 which are juxtaposed at equal intervals up and down in said supporting member 1, a holder which holds both ends of said lamps 2 inside the flame portion, and a plurality of clips 3 which hold the middles of said lamps 2 to said back wall 12, and an internal surface portion of the supporting member 1 is a reflective surface for reflecting light the lamps 2 emit on an open portion side of the supporting member 1.

The illuminant device constructed thus differs in a juxtaposition interval H of the rod-shaped lamps 2 depending on a model. In the back wall 12 of the supporting member 1 of one model in which the juxtaposition interval H is large, as shown in FIG. 4, between the two adjacent lamps 2, 2 and on a central side in a longitudinal direction of the lamps 2, a plurality of lock holes 13 are provided at a distance up and down. Rotation preventing recesses 14, 14 are provided in alignment with the lock hole 13 up and down at positions opposing two adjacent lamps 2, 2.

Figure 5:
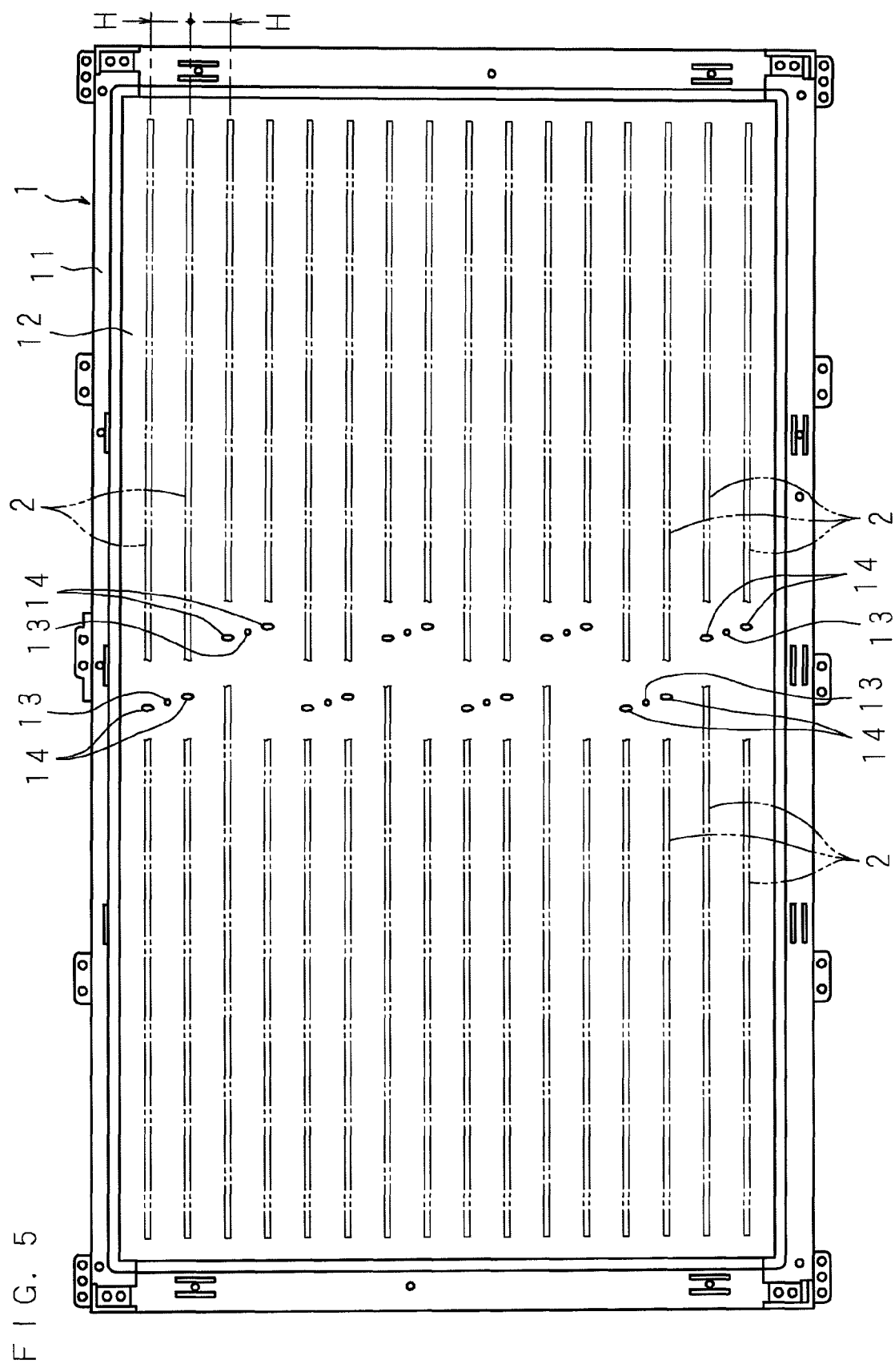
FIG. 5 is a front view showing a construction of the illuminant device provided with the supporting member which supports lamps whose juxtaposition intervals H are narrow.

In the back wall of the supporting member of another model in which the juxtaposition interval H is narrow as shown in FIG. 5, between the two adjacent lamps 2, 2 and on the central side in the longitudinal direction of the lamps 2, a plurality of lock holes 13 are provided at a distance up and down. Rotation preventing recesses 14, 14 which are displaced to both sides in the longitudinal direction of the lamp 2 with respect to the lock hole 13 are provided at positions opposing the two adjacent lamps 2, 2.

Each of the lock holes 13 has a circular shape, and each of the rotation preventing recesses 14, 14 has a shape of an ellipse whose longitudinal direction is up and down, and a plurality of groups of the lock hole 13 and the rotation preventing recesses 14, 14 are provided corresponding to the number of the lamps 2.

Each of the lamps 2 is a cold cathode tube which has electrodes on both ends thereof, and an inverter circuit substrate is connected to the electrodes of each lamp 2, and the lamp is constructed such that luminosity is controlled by a pulse width modulation signal.

Each of the clips 3 includes a substrate 31 which opposes the reflective surface of the supporting member 1, two clipping portions 32, 32 which project on one face at the same interval as said juxtaposition interval H of one model and clip the intermediate parts of the two adjacent lamps 2, 2, a columnar projection 33 which projects on a central part between said clipping sections 32, 32, a mounting portion 34 which projects on a central part of the other face of the substrate 31 and is inserted in and locked to the lock hole 13, two holding projecting portions 35, 35 which are arranged on both sides of said mounting portion 34 and are inserted in the rotation preventing recesses 14, 14, and two first flexible portions 36, 36 which are arranged between the clipping portions 32, 32 and the columnar projection 33 and are capable of bending in a direction in which a distance between the clipping portions 32, 32 is shortened, and the clip is made of synthetic resin and are molded integrally.

The mounting portion 34 has two claw parts at edges of a plate-shaped projected piece, and the claw parts are locked to a hole edge part of the lock hole 13. The clipping portions 32, 32 have two clipping pieces which clip the lamps 2. The columnar projection 33 has a conic shape and extends exceeding the clipping portions 32, 32 in a direction opposite to the mounting portion 34.

The flexible portions 36, 36 are formed so as to be thin-walled by making recesses at two positions of the substrate 31 in a direction along the plate surface, and constitute position changing means (position changing section) which changes a relative position of the clipping portions 32, 32. The flexible portions 36, 36 constitute distance changing means (distance changing section) which changes a distance between the clipping portions 32, 32 in a direction in which said lamps 2 are juxtaposed.

In the illuminant device constructed as mentioned above, the mounting portion 34 of the clip 3 is inserted in and locked to the lock hole 13 of the supporting member 1, while the holding projecting portions 35, are fitted in the rotation preventing recesses 14, 14, and both ends of a plurality of the lamps 2 are held in the supporting member 1 by being juxtaposed in the supporting member 1, with the holder mounted on the flame portion 11, while the intermediate parts of the lamps 2 are inserted and clipped in the clipping portions 32, 32 of the clip 3.

Since the clip 3 is formed such that a distance between the clipping portions 32, 32 can be changed by having the flexible portions 36, 36 between the clipping portions 32, 32 and bending said flexible portions 36, 36, as shown in FIG. 4, in one model in which the juxtaposition intervals H of the lamps 2 are large, the intermediate parts of two adjacent lamps 2, 2 can be clipped in a state where a distance between the clipping portions 32, 32 is a longest distance L, without bending the flexible portions 36, 36.

As shown in FIG. 5, in another model in which the juxtaposition intervals H of the lamps 2 are narrow, the intermediate parts of two adjacent lamps 2, 2 can be clipped in a state where the flexible portions 36, 36 are bent and a distance between the clipping portions 32, 32 is a distance L1 shorter than the longest distance L. Since an angle of bend in the flexible portions 36, 36 can be changed arbitrarily, the clip can be shared by a plurality of models in which said juxtaposition intervals H differ.

As for the clipping portions 32, 32 side of the clip 3 which clip the intermediate parts of two lamps 2, 2, since the holding projecting portions 35, 35 and the rotation preventing recesses 14, 14 can prevent movement of the clipping portions 32, 32 with respect to the back wall 12, bending load is not applied on the lamps 2 from the clipping portions 32, 32.

In another model in which said juxtaposition interval H is narrow, as shown in FIG. 2, since the clipping portions 32, 32 of the adjacent lamps 2 do not align up and down because the clipping portions 32, 32 which clip the lamps 2 are displaced in the longitudinal direction of the lamp 2, uneven brightness hardly occurs in this portion. Since the flexible portions 36, 36 are formed so as to be thin-walled by making recesses at two positions of the substrate 31 in the direction along the plate surface and capacity of the clip 3 is reduced, heat capacity by which heat is absorbed from the lamp 2 to the clip 3 can be reduced. Therefore, at an early stage of lighting of the lamp 2, since time required for temperature of the lamp 2 to attain a steady state shortens, and occurrence time of uneven brightness shortens, and thereby display quality can be improved.

FIGS. 8 to 11 show other constructions of the clip 3, and in which (a) is a front view, (b) is a right side view, (c) is a left side view and (d) is a right side view showing a state where a distance between the clipping portions 32, 32 is shortened, respectively.

In a clip shown in FIG. 8, instead of providing one mounting portion 34, two mounting portions 34 are provided and a positioning projecting portion 37 is provided between the mounting portions 34, 34. The mounting portions 34, 34 are arranged at a distance equal to the distance between the clipping portions 32, 32.

In the back wall 12 of the supporting member 1 of the illuminant device on which the clip 3 is mounted, two lock holes 13, 13 having a circular shape are provided instead of the two rotation preventing recesses 14, 14, and a positioning recess corresponding to the positioning projecting portion 37 is provided between the lock holes 13, 13, and a plurality of groups of the lock holes 13, 13 and the positioning recess are provided corresponding to the number of the lamps 2.

The lock holes 13, 13 which are provided in the supporting member 1 of the illuminant device in which the juxtaposition interval H of the lamps 2 is large are provided at positions which oppose the two adjacent lamps 2, 2 and are in alignment with said positioning recesses up and down. The lock holes 13, 13 which is provided in the supporting member 1 of the illuminant device in which the juxtaposition interval H of the lamps 2 is narrow are provided at positions which oppose the two adjacent lamps 2, 2 and are displaced to both sides in the longitudinal direction of the lamps 2 with respect to said positioning recess.

According to this embodiment, the two mounting portions 34, 34 are inserted in and locked to the lock holes 13, 13 of the supporting member 1, the positioning projecting portion 37 is fitted in the positioning recess, and a mounting position of the clip 3 with respect to the supporting member 1 is determined. Therefore, the clip 3 can be correctly mounted on the group of two lock holes 13, 13 and positioning recess. Since the two mounting portions 34, 34 are provided closer to the clipping portions 32, 32 than the flexible portions 36, 36, stability of the clipping portions 32, 32 with respect to the supporting member 1 can be improved.

In another model in which said juxtaposition interval H is narrow, since the clipping portions 32, 32 of the adjacent lamps 2 do not align up and down because the clipping portions 32, 32 which clip the lamps 2 are displaced in the longitudinal direction of the lamp 2, uneven brightness hardly occurs in this portion.

Since other constructions and operations are the same as those of the clips of FIGS. 1 and 2, the same numerals are attached to the same parts, and the detailed explanation and explanation of the operation effect are omitted.

The clip 3 shown in FIG. 9 has the two clipping portions 32, 32 and mounting portions 34, 34, and in addition to those, holding projecting portions 35*a*, 35*a* outside the mounting portions 34, 34.

In the back wall 12 of the supporting member 1 of the illuminant device on which the clip 3 is mounted, rotation preventing recesses in which the holding projecting portions 35*a*, 35*a* are inserted are provided, and a plurality of groups of the lock holes 13, 13, the positioning recess and the rotation preventing recesses are provided corresponding to the number of the lamps 2.

According to this embodiment, the two mounting portions 34, 34 are inserted in and locked to the lock holes 13, 13 of the supporting member 1, the positioning projecting portion 37 is fitted in the positioning recess, and the holding projecting portions 35*a*, 35*a* are fitted in the rotation preventing recesses. Therefore, since movement with respect to the back wall 12 of the clipping portions 32, 32 can be prevented, bending load is not applied on the lamps 2, 2 from the clipping portions 32, 32.

Since other constructions and operations are the same as those of the clips of FIGS. 1 and 2, the same numerals are attached to the same parts, and the detailed explanation and explanation of the operation effect are omitted.

The clip 3 shown in FIG. 10 is based on the construction in which two clipping portions 32, 32 and mounting portions 34, 34 are provided, and instead of forming the first flexible portion 36, 36 so as to be thin-walled by making recesses in the substrate 31 in the direction along the plate surface, a rectangular through hole 38 which penetrate both sides are provided in the central part of the substrate 31, in other words, between the clipping portions 32, 32 and second flexible portions 36*a*, 36*a* are provided in edges of corner parts on the clipping portions 32, 32 side of said through hole 38, and the columnar projection 33 is provided in the substrate 31 between the two flexible portions 36*a*, 36*a*. Note that the second flexible portions 36*a*, 36*a* constitute position changing means (position changing section) which changes a relative position of the clipping portions 32, 32, and distance changing means (distance changing section).

In this embodiment, in one model in which said juxtaposition interval H is large, since the two mounting portions 34, 34 are inserted in and locked to the lock holes 13, 13 of the supporting member 1, without bending the flexible portions 36*a*, 36*a*, a distance between the clipping portions 32, 32 is a longest distance L. In another model in which said juxtaposition interval H is narrow, by bending the flexible portions 36*a*, 36*a* and displacing the clipping portions 32, 32 which clip the lamps 2, 2 in the longitudinal direction of the lamp 2, a distance between the clipping portions 32, 32 is a distance L1 shorter than the longest distance L. Since the clipping portions 32, 32 of the adjacent lamps 2 do not align up and down because the clipping portions 32, 32 are displaced in the longitudinal direction of the lamp 2, uneven brightness hardly occurs in this portion. Since the columnar projection 33 is provided in a non-flexible portion, an uprising state of the columnar projection 33 can be maintained without being influenced by the flexible portions 36*a*, 36*a*, and an optical sheet in the display device can be received properly.

Since other constructions and operations are the same as those of the clip of FIGS. 1 and 2, the same numerals are attached to the same parts, and the detailed explanation and explanation of the operation effect are omitted.

The clip 3 shown in FIG. 11 is based on the construction in which two clipping portions 32, 32 and mounting portions 34, 34 are provided, and instead of forming the first flexible portions 36, 36 so as to be thin-walled by making recesses in the substrate 31 in the direction along the plate surface, a rectangular through hole 38 which penetrate both sides are provided in the central part of the substrate 31, in other words, between the clipping portions 32, 32, third flexible portions 36*b*, 36*b*, 36*b* are provided at three positions of edges of corner parts on the clipping portions 32, 32 side of said through hole 38 and a central part between the clipping portions 32, 32, and on one side of edges of the through hole 38 and on the substrate 31 between the two flexible portions 36*b*, 36*b*, the columnar projection 33 is provided. Note the third flexible portions 36*b*, 36*b* constitute position changing means (position changing section) which changes a relative position of the clipping portions 32, 32, and distance changing means (distance changing section).

In the back wall 12 of supporting member 1 in one model in which the juxtaposition interval H is large, and another model in which the juxtaposition interval H is narrow, the lock holes 13, 13 are provided at positions opposing the two adjacent lamps 2 at a distance up and down.

In this embodiment, in one model in which said juxtaposition interval H is large, since the two mounting portions 34, 34 are inserted in and locked to the lock holes 13, 13 of the supporting member 1, without bending the flexible portions 36*b*, 36*b*, 36*b*, a distance between the clipping portions 32, 32 is a longest distance L. In another model in which said juxtaposition interval H is narrow, since the three flexible portions 36*b*, 36*b*, 36*b* bend and the clipping portions 32, 32 which clip the lamps 2, 2 are displaced in a direction in which the clipping portions approach mutually, a distance between the clipping portions 32, 32 is a distance L1 shorter than the longest distance L. Since the columnar projection 33 is provided in the non-flexible portion, an uprising state of the columnar projection 33 can be maintained without being influenced by the flexible portion 36*b*, and an optical sheet in the display device can be received properly.

Since other constructions and operations are the same as those of the clip of FIGS. 1 and 2, the same numerals are attached to same parts, and the detailed explanation and explanation of the operation effect are omitted.

Figure 12:
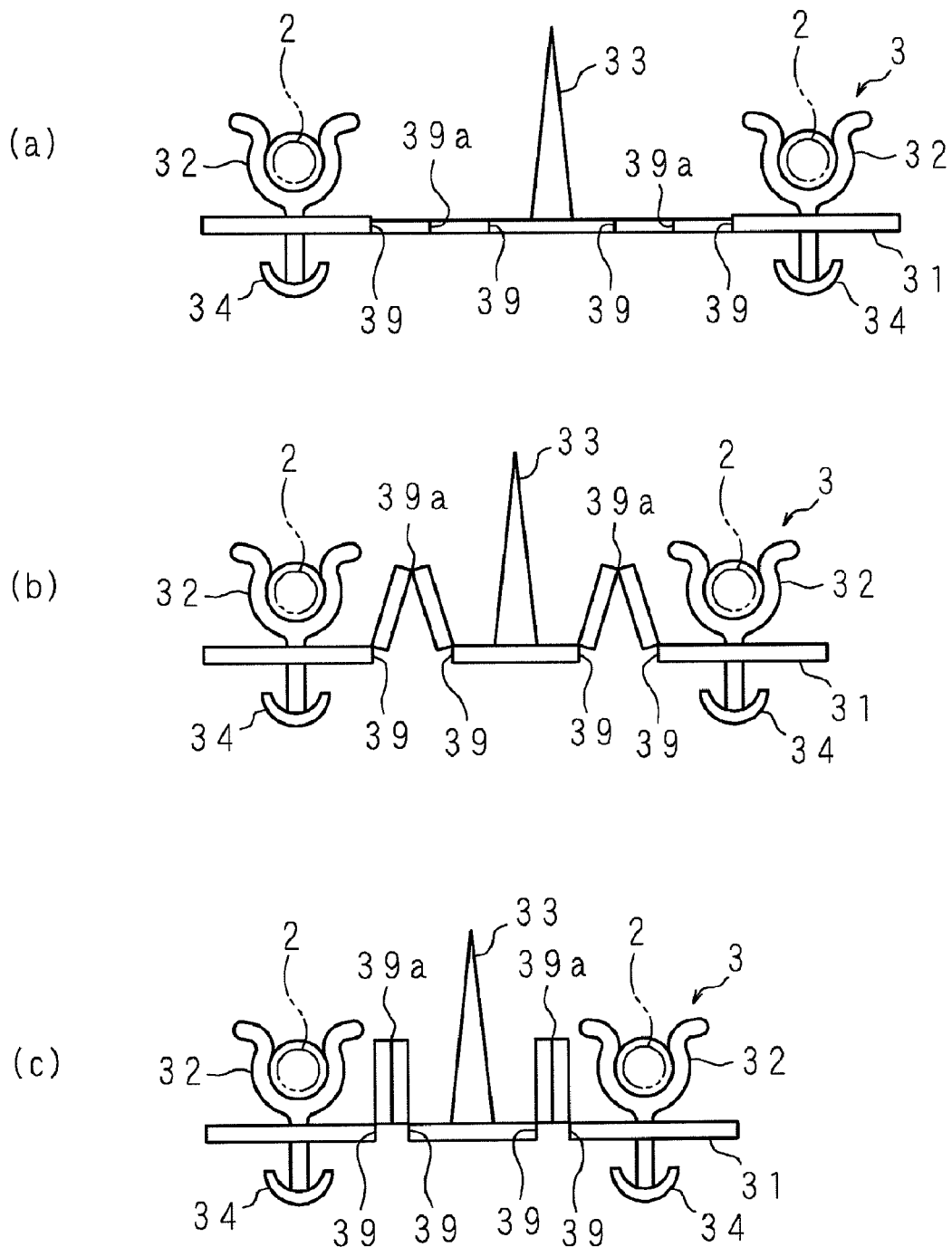
FIG. 12 is a view showing another construction of the clip according to the present invention, in which (a) is a front view, and (b) and (c) are front views showing a state where a distance between the clipping portions is shortened.

FIG. 12 shows other construction of the clip 3 and in which (a) is a front view and (b) and (c) are front views showing a state where a distance between the clipping portions 32, 32 is shortened. The clip 3 is based on the construction in which two clipping portions 32, 32 and mounting portions 34, 34 are provided, and instead of forming the first flexible section 36, 36 so as to be thin-walled by making recesses in the direction along the plate face, second groove portions 39a, 39a are provided on one face of the substrate 31 and first groove portions 39, 39 are provided on the other face, and thus a distance between the two clipping portions 32, 32 can be changed. Note that the first and second groove portions 39, 39a constitute position changing means (position changing section) which changes a relative position of the clipping portions 32, 32, and distance changing means (distance changing section).

The second groove portions 39a, 39a are provided by forming two grooves on one face of the substrate 31 at a distance, and the first groove portions 39, 39 are provided by forming two pairs of two grooves on the other face of the substrate 31 at a distance, and thereby the substrate 31 between the clipping portions 32, 32 can be deformed into a trapezoidal shape. On the other face of the substrate 31, the two pairs of two first groove portions 39, 39 are provided in parallel with the longitudinal direction of the lamp 2 between the clipping portions 32, 32, and on said one face of the substrate 31, the two second groove portions 39a, 39a are provided in parallel with the longitudinal direction of the lamp 2 between the two pairs of first groove portions 39, 39 respectively. The columnar projection 33 is provided between the second groove portions 39a, 39a in said one face of the substrate 31.

In the back wall 12 of supporting member 1 in one model in which the juxtaposition interval H is large and another model in which the juxtaposition interval H is narrow, the lock holes 13, 13 are provided at positions opposing the two adjacent lamps 2 at a distance up and down.

In one model in which the juxtaposition interval H is large, without bending the groove portions 39, 39a, the two mounting portions 34, 34 are inserted in and locked to the lock holes 13, 13 of the supporting member 1. In another model in which said juxtaposition interval H is narrow, since the groove portions 39, 39a bend, the central part of the substrate 31 is deformed into a trapezoidal shape, the clipping portions 32, 32 which clip the lamps 2 are displaced in a direction in which the clipping portions 32, 32 approach mutually, a distance between the clipping portions 32, 32 narrows.

Figure 13:
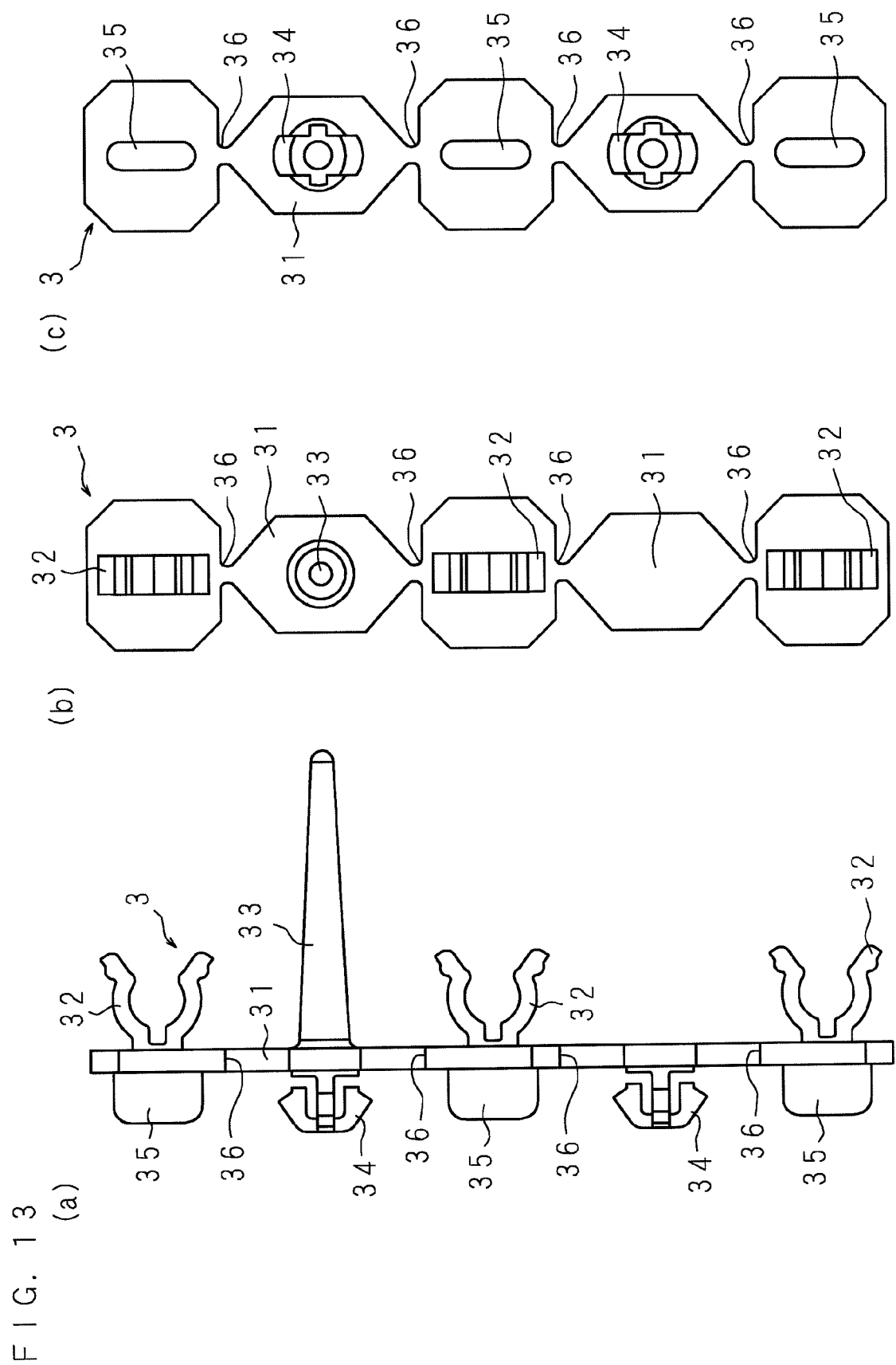
FIG. 13 is a view showing a construction of a clip which has three clipping portions, in which (a) is a front view, (b) is a right side view, and (c) is a left side view.

The clip 3 which has the two clipping portions 32, 32 and clips two lamps is explained in the embodiments described above, and in addition to this, the clip 3 may have three or more clipping portions 32 and clip three of more lamps, and also the clip may have two or more clipping portions 32. FIG. 13 shows a construction of a clip which has three clipping portions 32, in which (a) is a front view, (b) is a right side view and (c) is a left side view. In this embodiment, two flexible portions 36 are provided between the three clipping portions 32, respectively. Although the clip has two mounting portions 34 and three holding projecting portions 35, the number of the mounting portions 34 and holding projecting portions 35 is not restricted in particular. In FIGS. 9 to 12, it can be constructed similarly.

Although the columnar mounting portion 34 is provided in the embodiments described above, in addition to this, the mounting portion 34 may be mounted on the supporting member 1 by a magnet, and a construction of the mounting portion 34 is not restricted in particular.

Although the columnar projection 33 is provided in the above embodiment, alternatively, the columnar projection 33 is not necessarily required.

Although the holding projecting portions are provided as means which holds positions of the clipping portions 32, 32 with respect to the supporting member 1, the mounting portion may alternatively have a non-circular shape having an elliptical cross section, for example, without the holding projecting portions, and the mounting portion may be inserted in and locked to the non-circular lock holes formed in an elliptical shape or the like.

The clip according to the present invention is used for the illuminant device provided with lamps which are juxtaposed at equal intervals up and down, and in addition to this, it may be used for the illuminant device provided with lamps which are juxtaposed at unequal intervals up and down. The illuminant device may be provided with lamps which are juxtaposed at unequal intervals up and down.

Figure 14:
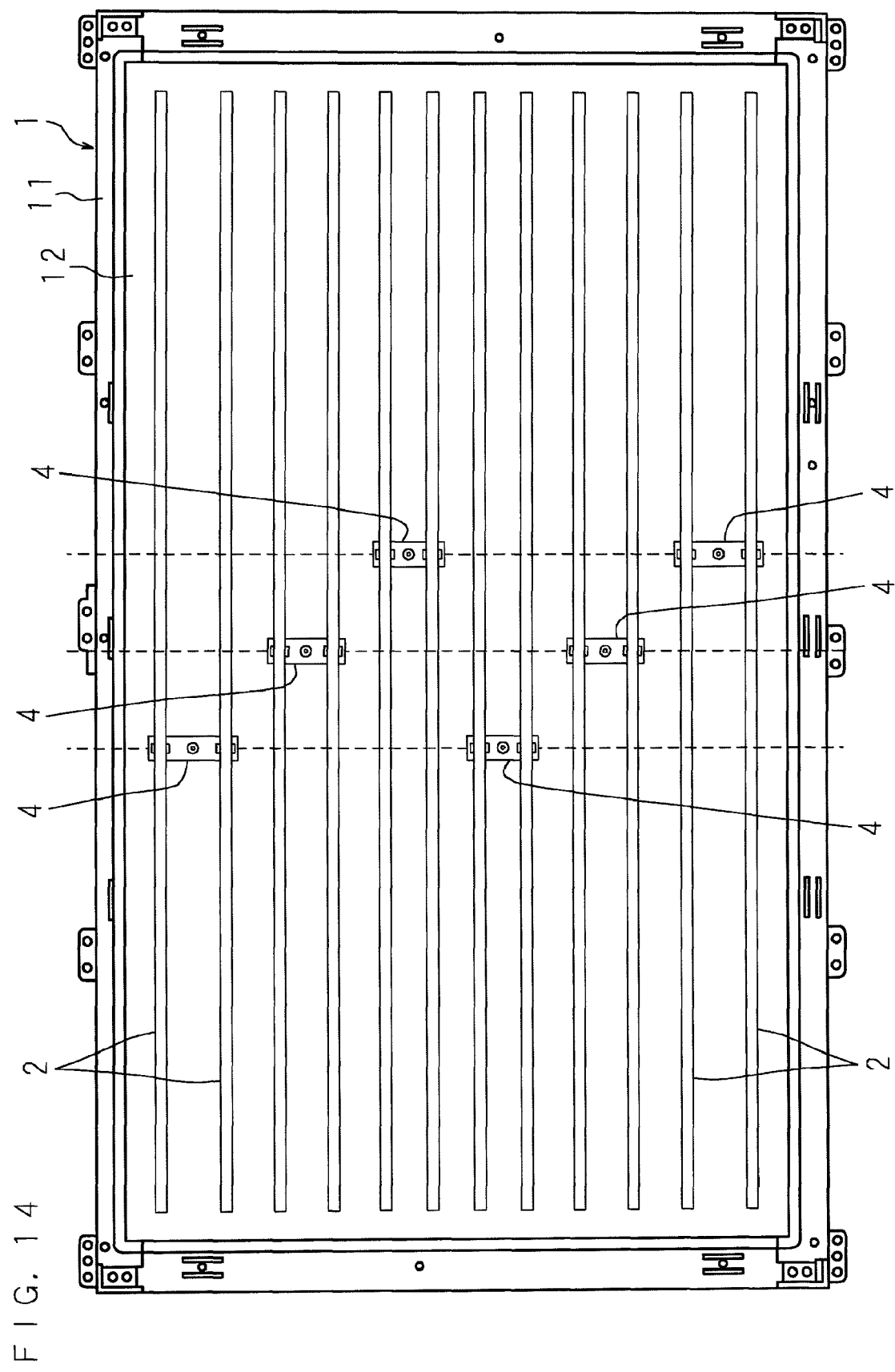
FIG. 14 is a front view showing another construction of the illuminant device according to the present invention.
Figure 15:
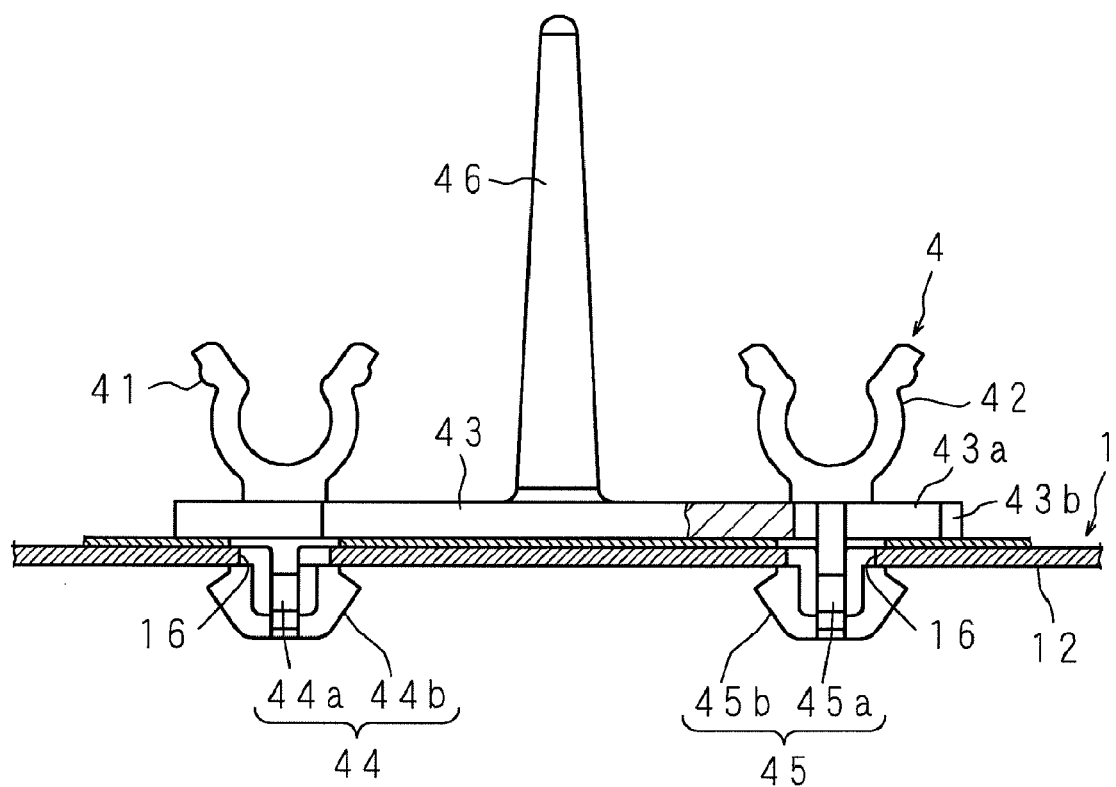
FIG. 15 is an expanded sectional view of a mounting portion showing another construction of the clip according to the present invention.
Figure 16:
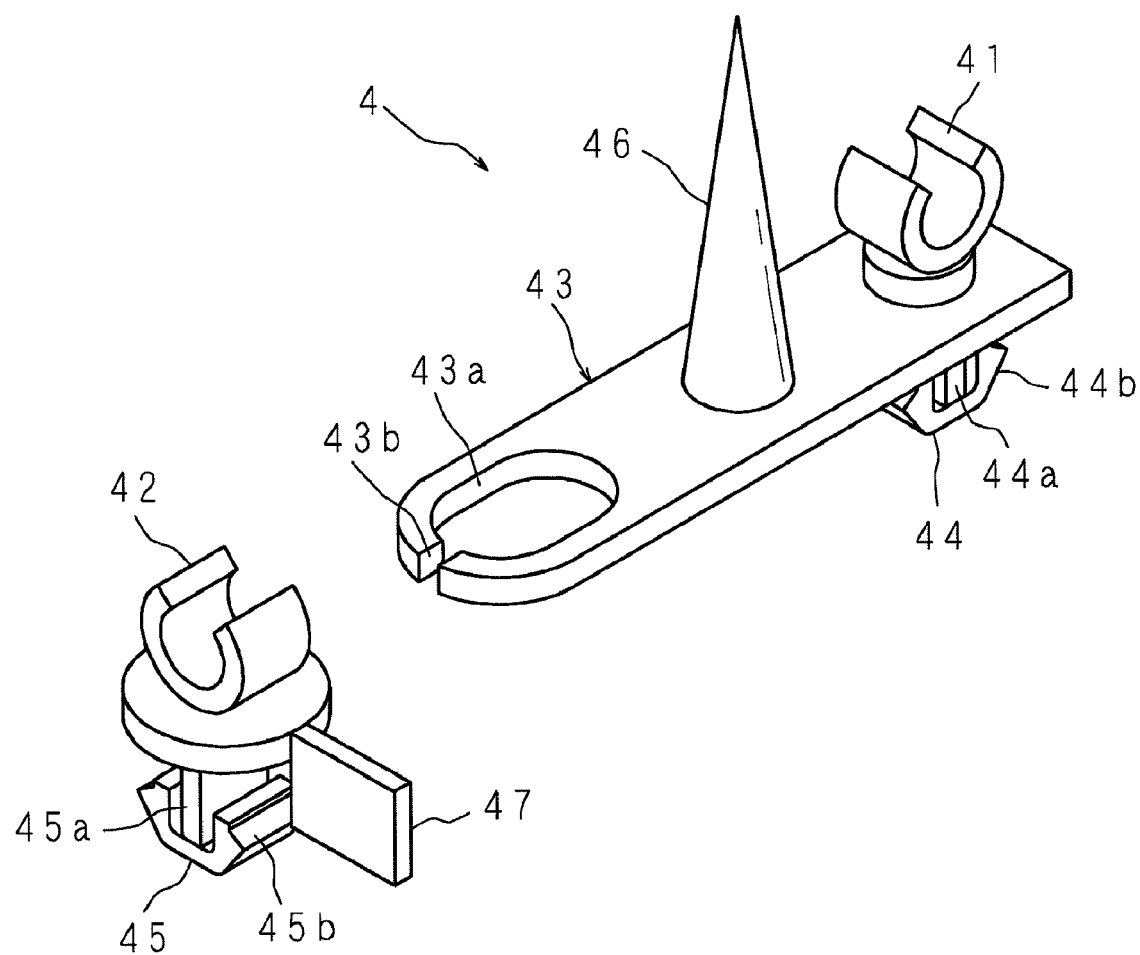
FIG. 16 is a partially exploded perspective view showing another construction of the clip according to the present invention.
Figure 17:
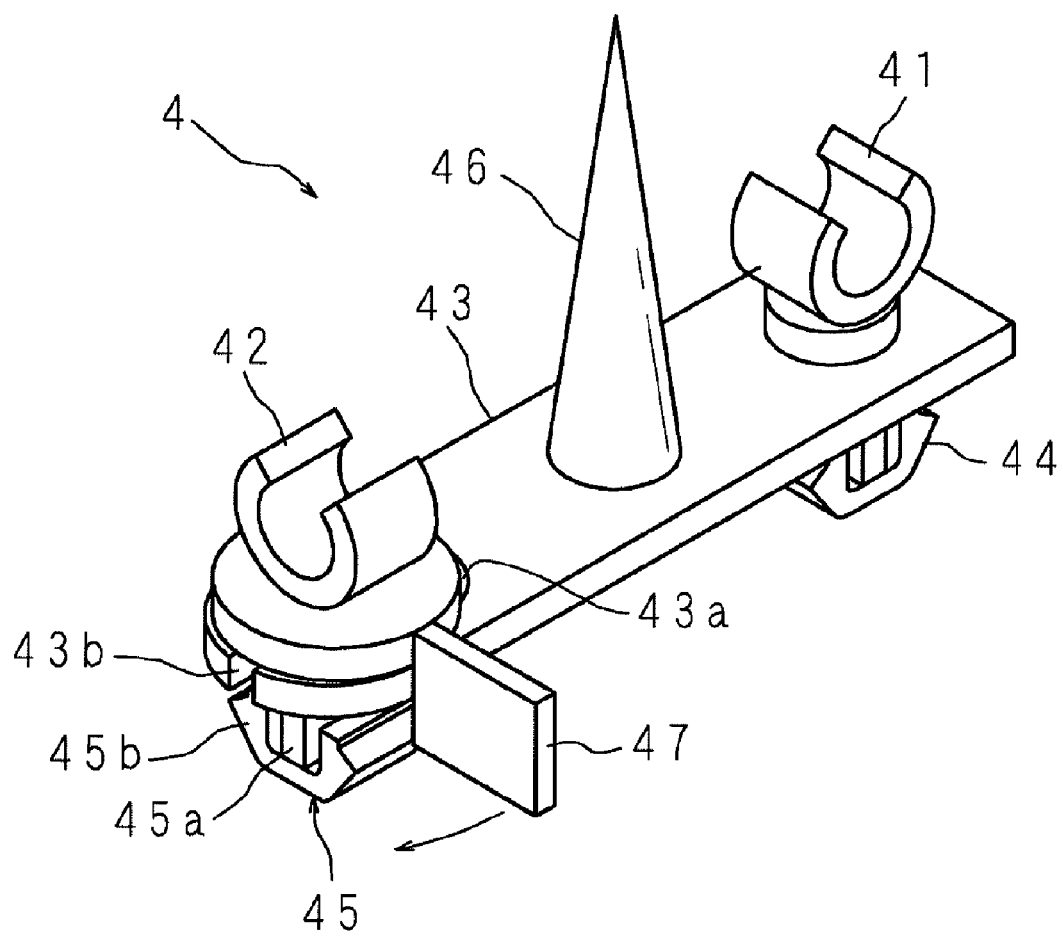
FIG. 17 is a perspective view showing an assembly process of the clip according to the present invention.
Figure 18:
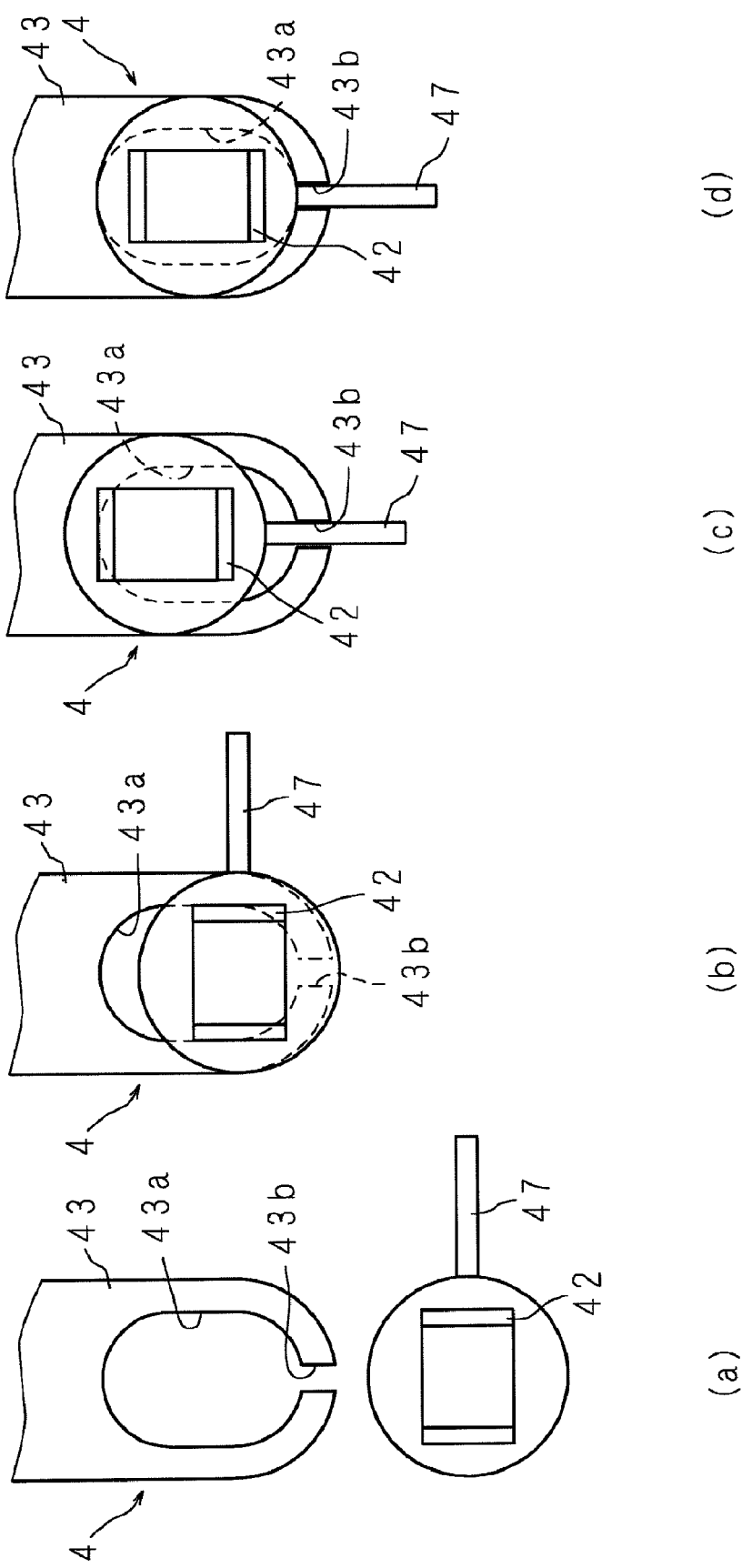
FIG. 18 is an explanatory view showing an assembly process of the clip according to the present invention.
Figure 19:
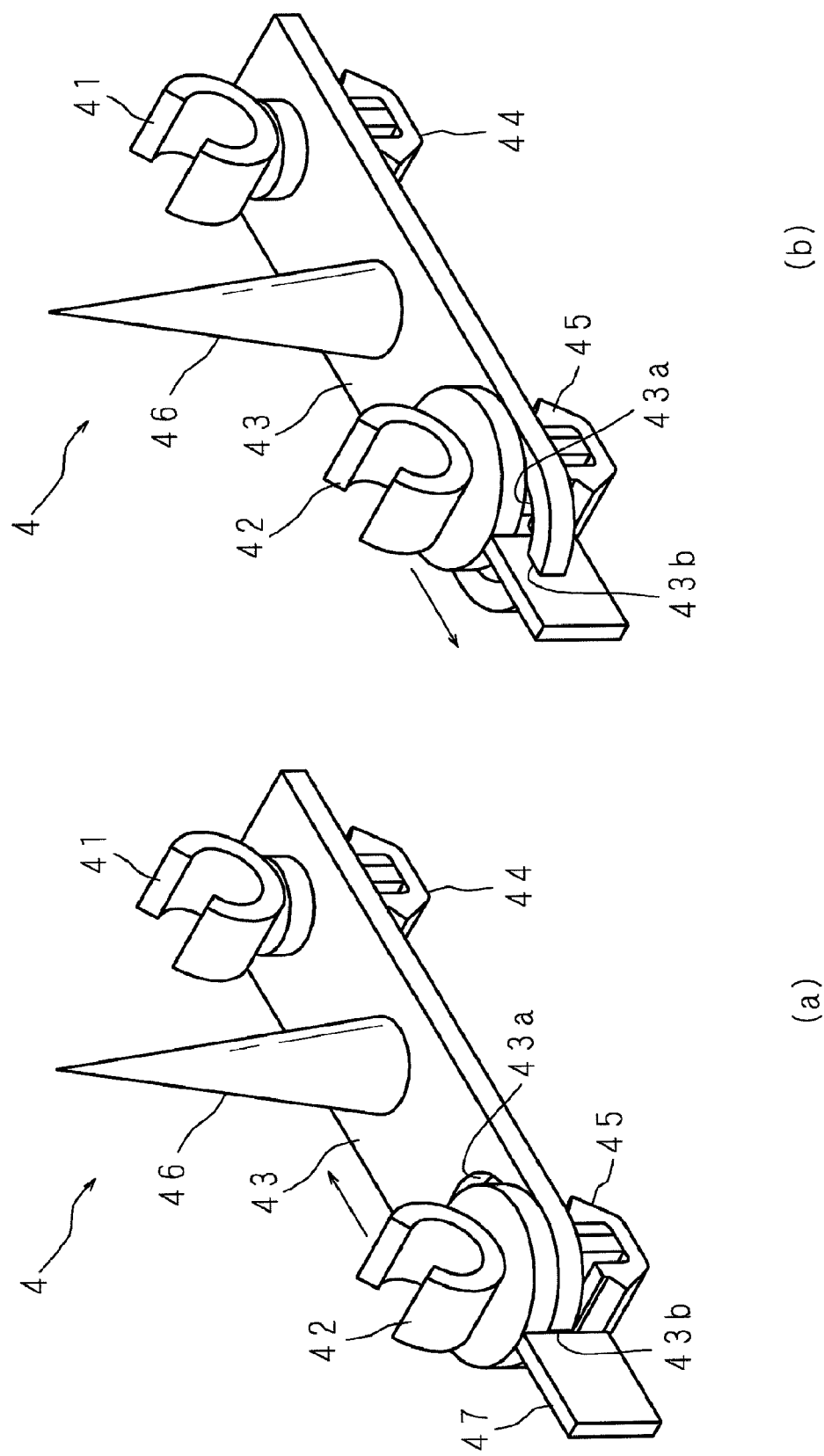
FIG. 19 is a perspective view in a state where an interval between the clipping portions of the clip according to the present invention is changed.

Another embodiment of the present invention is detailed based on the drawings below. FIG. 14 is a front view showing another construction of the illuminant device according to the present invention, FIG. 15 is an expanded sectional view of a mounting portion showing another construction of the clip, FIG. 16 is a partially exploded perspective view showing another construction of the clip, FIG. 17 is a perspective view showing an assembly process of the clip, FIG. 18 is an explanatory view showing an assembly process of the clip, FIG. 19 is a perspective view in a state where an interval between the clipping portions of the clip is changed, and FIG. 20 is the front view in which a part of the supporting member is omitted.

The illuminant device shown in FIGS. 14 to 20 comprises a box-shaped supporting member 1 which is open on a front side thereof and includes a frame portion 11 having a rectangular parallelepiped and a back wall 12 an edge portion of which is joined to the frame portion 11 and which closes a back side end of said frame portion 11, a plurality of rod-shaped lamps 2 which are juxtaposed at different intervals up and down in said supporting member 1, a holder which holds both ends of said lamps 2 inside the frame portion, and a plurality of clips 4 which hold the intermediate parts of said lamps 2 to said back wall 12, and an internal surface portion of the supporting member 1 is a reflective surface for reflecting light the lamps 2 emit on an open portion side of the supporting member 1.

Figure 20:
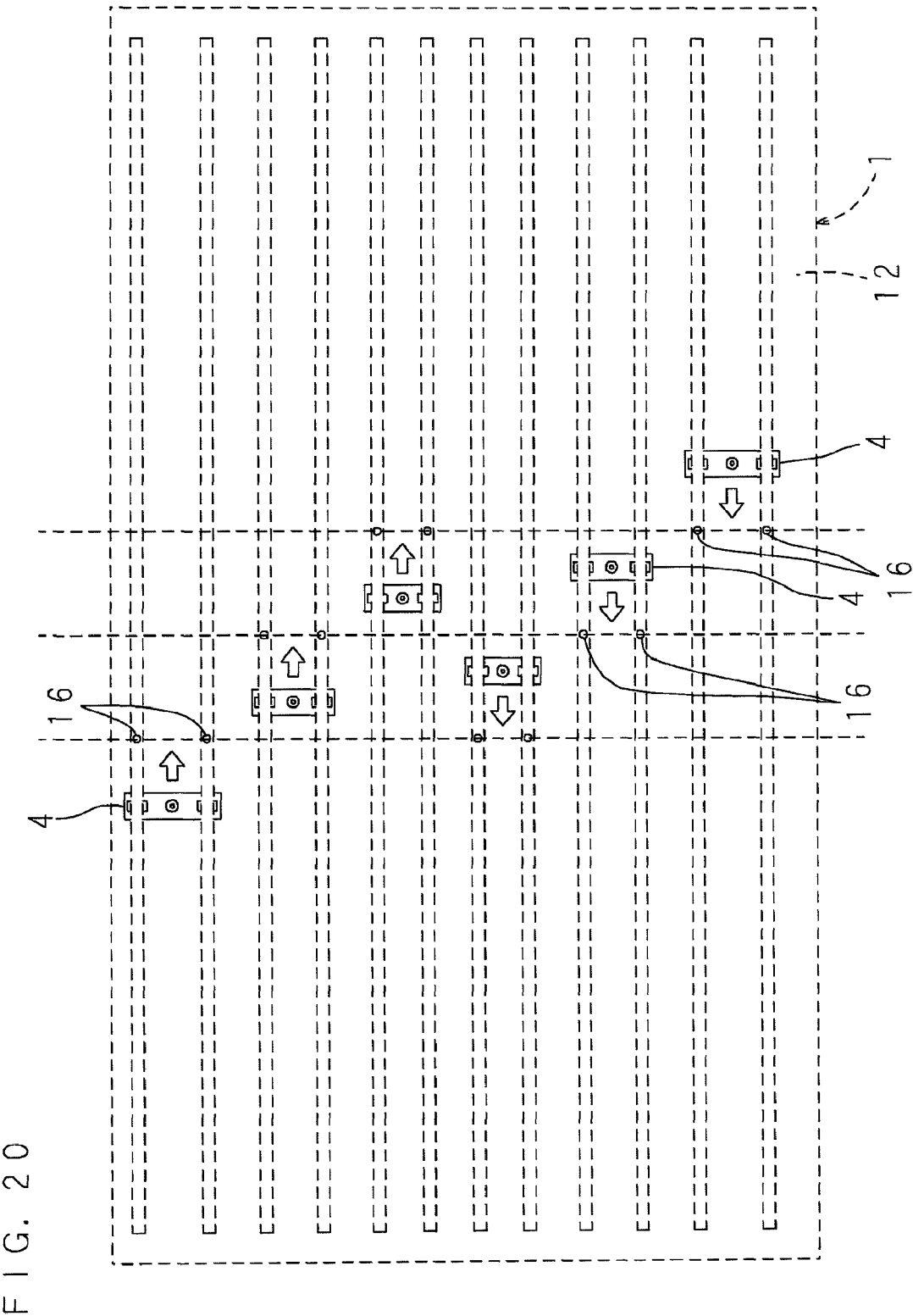
FIG. 20 is a front view in which a part of the supporting member of the illuminant device according to the present invention is omitted.

As shown in FIGS. 14 and 20, the lamp 2 is constructed such that a juxtaposition interval in the central part in the juxtaposition direction becomes the narrowest and a juxtaposition interval becomes larger gradually as it goes to an upper side and lower side in the juxtaposition direction, and said holder maintains this juxtaposition interval. The lamp 2 is a cold cathode tube which has electrodes on both ends, an inverter circuit substrate is connected to the electrodes of each lamp 2, and the lamp is constructed so that luminosity is controlled by a pulse width modulation signal.

The clip 4 is made of synthetic resin and includes first and second clipping portions 41, 42 in which the intermediate parts of the two adjacent lamps 2, 2 are fitted and clipped, a plate-shaped holding base 43 which opposes the reflective surface of the supporting member 1 and holds the first and second clipping portions 41, 42, first and second mounting portions 44, 45 which mount said holding base 43 on the supporting member 1 and a columnar projection 46 which projects in the central part between the first and second clipping portions 41, 42.

The holding base 43 has a rectangular plate-shape, the first clipping portion 41 is provided on one face of one end in a longitudinal direction of said holding base 43, the first mounting portion 44 is provided on the other face, and the columnar projection 46 is provided in a central part of said one face, and the first clipping portion, the first mounting portion and the columnar projection are formed integrally. A hold hole 43*a* having a shape of an ellipse is provided on said other end of the holding base 43 in a longitudinal direction. An open portion 43*b* which is open from the hold hole 43*a* at the edge of the longitudinal direction is provided. Note that the hold hole 43*a* constitutes position changing means (position changing section) which changes a relative position of the clipping portions 41, 42, and distance changing means (distance changing section).

The second clipping portion 42 and the second mounting portion 45 are molded integrally, and said second mounting portion 45 is inserted and held in the hold hole 43*a* slidably. The first and second clipping portions 41, 42 have two clipping pieces which clip the lamps 2. The first and second mounting portions 44, 45 have two claw parts 44*b*, 45*b* at edges of plate-shaped bases 44*a*, 45*a*, and the claw parts 44*b*, 45*b* are locked in hole edge parts of mount holes 16, 16 described later. The plate-shaped base 45*a* of the second mounting portion 45 is formed to be rotatable about 90 degrees in the hold hole 43*a*, so as not to come off from the hold hole 43*a* and the open portion 43*b* in a state where it is rotated about 90 degree.

A regulating tongue (regulating portion) 47 which regulates rotation of the second clipping portion 42 and the second mounting portion 45 fitted in the open portion 43*b* which is open, with respect to the holding base 43 is provided in a boundary part between the second clipping portion 42 and the second mounting portion 45.

When the base 45*a* of the second mounting portion 45 is fitted in the hold hole 43*a* from the open portion 43*b*, the regulating tongue 47 contacts one side surface of the holding base 43. In this state when the second clipping portion 42 and second mounting portion 45 are rotated about 90 degrees, the regulating tongue 47 is located at a position which faces the open portion 43*b*, and in this state the regulating tongue 47 is inserted and fitted in the open portion 43*b*, and thereby, rotation of the second clipping portion 42 and the second mounting portion 45 can be regulated, and in this state the second clipping portion 42 and the second mounting portion 45 can slide along the hold hole 43*a* in the hold hole 43*a*.

The columnar projection 46 has a conical shape and extends exceeding the clipping portions 41, 42 in a direction opposite to the mounting portions 44, 45.

In the back wall 12 of the supporting member 1, a plurality of groups of the two mount holes 16, 16 provided at a juxtaposition interval of the lamps 2 are provided at positions which oppose central parts in the longitudinal direction of the lamps 2, and at positions spaced in a juxtaposition direction of the lamps 2 corresponding to the number of the lamps 2.

As for the illuminant device constructed as mentioned above, while the first and second mounting portions 44, 45 of the clip 4 are inserted in and locked to the two mount holes 16, 16 of the supporting member 1, a plurality of the lamps 2 are juxtaposed in the supporting member 1 at a distance up and down, and both ends of the lamps 2 are held in the supporting member 1 by the holder mounted in the frame portion 11, and the intermediate parts (central parts) of the two adjacent lamps 2, 2 are inserted and clipped in the first clipping portion 41 and the second clipping portion 42 of the clip 4.

The second clipping portion 42 and second mounting portion 45 of the clip 4 are held in the hold hole 43*a* of the holding base 43 slidably. Since a distance between the first and second clipping portions 41, 42 can be changed by sliding of the second clipping portion 42 and second mounting portion 45 in the hold hole 43*a*, the clip 4 can be shared with respect to the lamps 2 whose juxtaposition intervals differ.

When juxtaposition intervals of the lamps 2 to be clipped differ, by sliding the second clipping portion 42 and the second mounting portion 45, the adjacent lamps 2, 2 can be clipped easily and unforcedly, and thereby the clipping workability of the lamps 2 can be improved.

Figure 21:
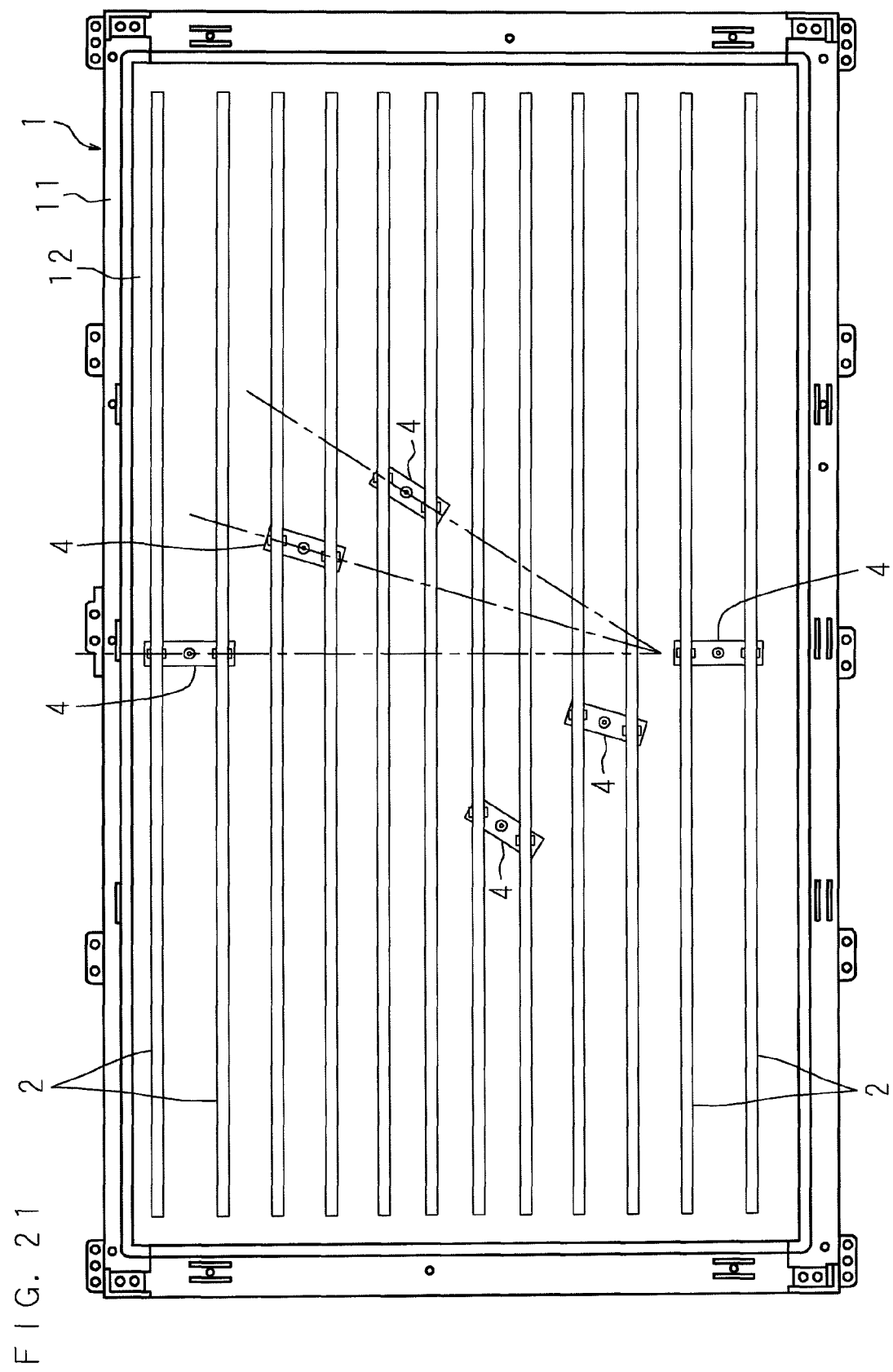
FIG. 21 is a front view showing another construction of the illuminant device according to the present invention.
Figure 22:
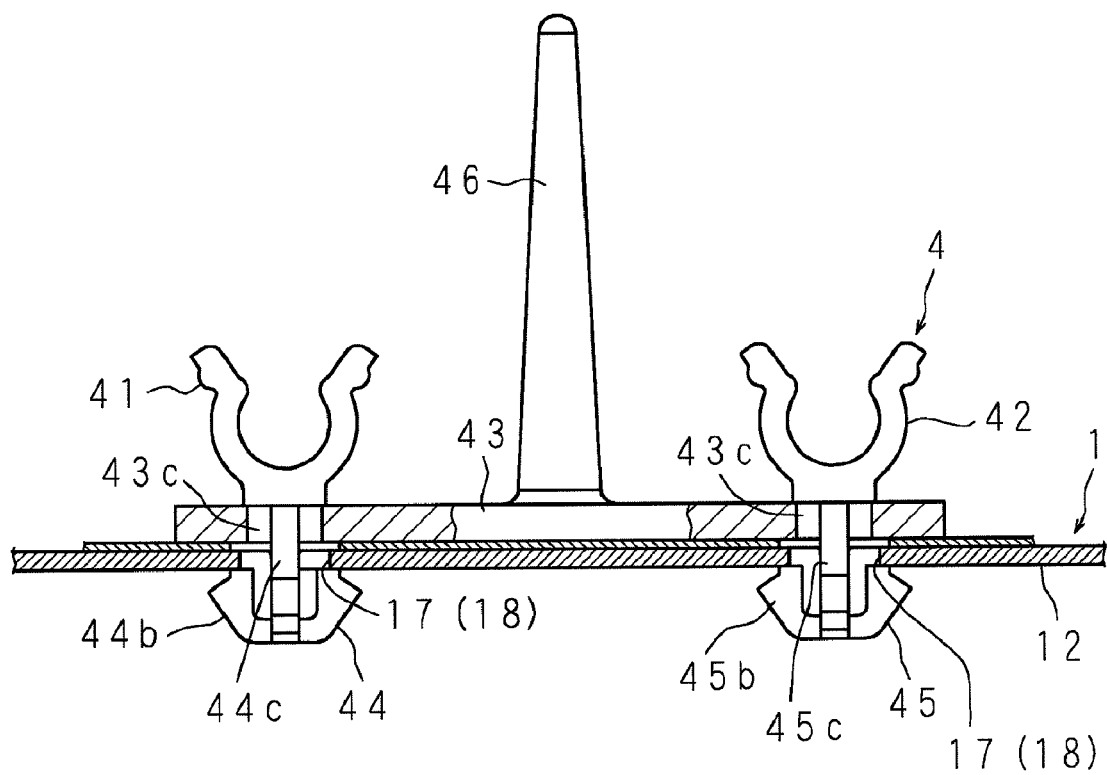
FIG. 22 is an expanded sectional view of a mounting portion of another clip.
Figure 24:
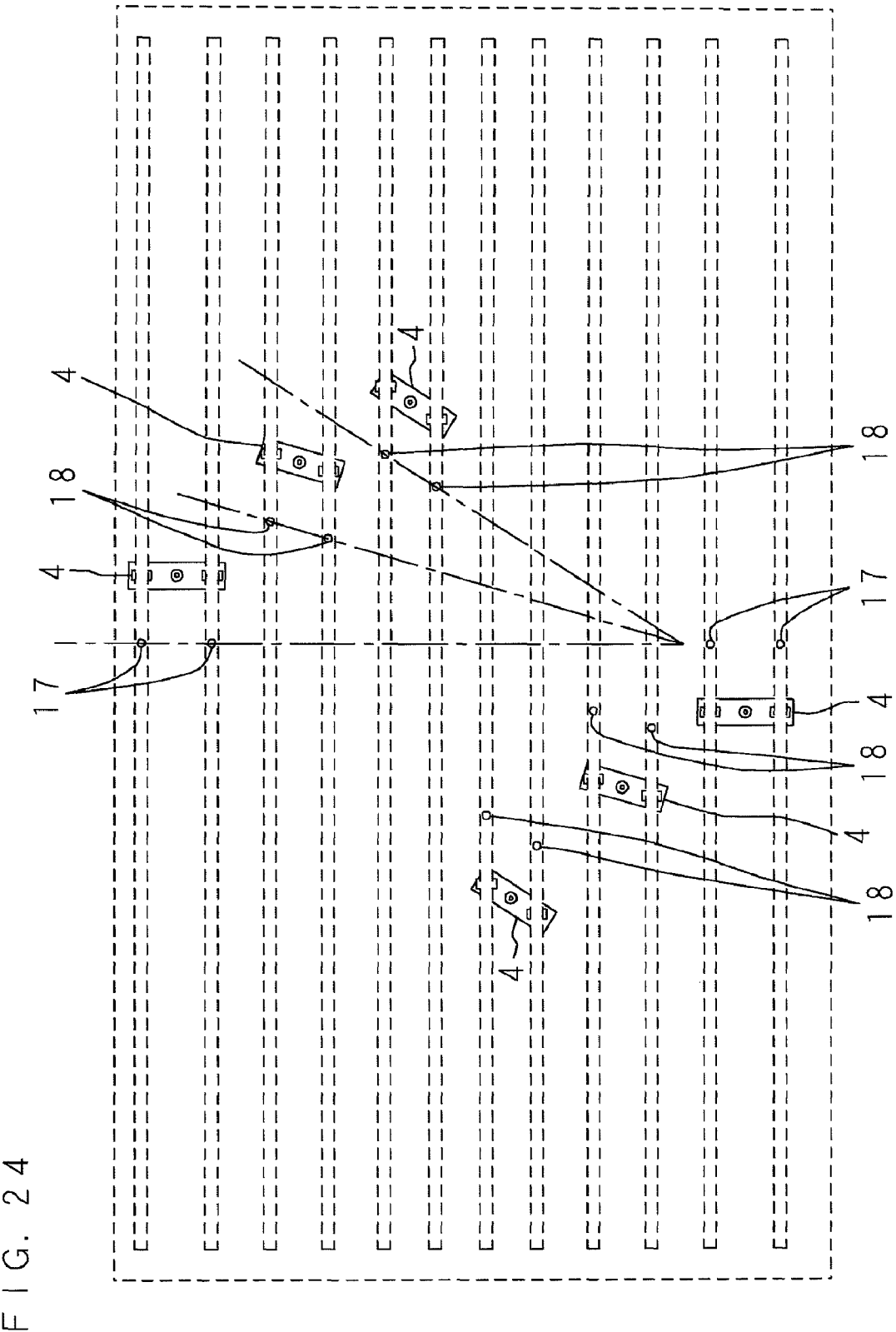
FIG. 24 is a schematic view showing a relationship of the clip and a mount hole according to the present invention.

FIG. 21 is a front view showing another construction of the illuminant device, FIG. 22 is an expanded sectional view of a mounting portion of another clip, and FIG. 23 shows another construction of the clip, in which (a) is exploded perspective view, (b) is a perspective view in a installed state. FIG. 24 is a schematic view showing a relationship between the clip and the mount hole. This illuminant device is, like the illuminant device shown in FIG. 14, an illuminant device in which the lamps 2 are juxtaposed so that a juxtaposition interval in the central part in the juxtaposition direction of the lamps 2 becomes the narrowest and a juxtaposition interval become larger gradually as it goes to an upper side and lower side in the juxtaposition direction. Instead of holding the second clipping portion 42 and second mounting portion 45 of the clip 4 on the holding base 43 slidably, the first clipping portion 41 and the first mounting portion 44, and the second clipping portion 42 and the second mounting portion 45 are held in the holding base 43 rotatably.

The first clipping portion 41 and the first mounting portion 44, and the second clipping portion 42 and the second mounting portion 45 are molded integrally, respectively. Circular hold holes 43*c*, 43*c* are provided in both ends in the longitudinal direction of the holding base 43 which has a rectangular plate-shape, and the first and second mounting portions 44, 45 are inserted in and locked to said hold holes 43*c*, 43*c* rotatably. Note that a construction in which the first and second mounting portions 44, 45 are rotatable provides position changing means (position changing section) which changes a relative position of the clipping portions 41, 42, and distance changing means (distance changing section).

The first and second mounting portions 44, 45 includes plate-shaped bases 44*c*, 45*c* of a size corresponding to a diameter of the hold holes 43*c*, 43*c* and mount holes 17, 17, 18, 18 described later, and two claw parts 44*b*, 45*b* which branch at the edges of said bases 44*c*, 45*c*. When fitting in the hold holes 43*c*, 43*c* and the mount holes 17, 17, 18, 18, the claw parts 44*b*, 45*b* bend. When the claw parts 44*b*, 45*b* elastically recover after fitting, said claw parts 44*b*, 45*b* are locked to hole edge parts of the hold holes 43*c*, 43*c* or hole edge parts of the mount holes 17, 17, 18, 18. In this locked state, rotation is possible, in other words, rotation is possible over a certain distance between the first and second clipping portions 41, 42.

FIG. 25 is an explanatory view showing a relationship between the clip and the lamp. In the back wall 12 of the supporting member 1 of the illuminant device on which the clip 4 is mounted, two first mount holes 17, 17 are provided at first positions in parallel with the juxtaposition direction of the lamps 2, and two second mount holes 18, 18 are provided at second positions which is inclined with respect to said juxtaposition direction. Angles of inclination of the second positions with respect to said juxtaposition direction differ corresponding to the juxtaposition interval of the lamps 2, and said angle of inclination becomes smaller as said juxtaposition interval becomes larger. A distance between the first mount holes 17, 17 and a distance between the second mount holes 18, 18 are equal.

In this embodiment, as for the clip 4 in which the mounting portions 44, 45 is inserted in and locked to the first and second mount holes 17, 17, 18, 18, since distances in the juxtaposition direction between the clipping portions 41, 42 differ corresponding to a juxtaposition interval of the lamps 2, and moreover, the first and second clipping portions 41, 42 of each clip 4 is rotatable with respect to the holding base 43, the lamp 2 can be clipped easily and unforcedly by rotating the first and second clipping portions 41, 42 corresponding to the positions of the lamps 2.

Since other constructions and operations are the same as those of the clips of FIGS. 15 and 16, the same numerals are attached to the same parts, and the detailed explanation and explanation of the operation effect are omitted.

Note that although the clip 4 which has the two clipping portions 41, 42 and clips two lamps is explained in the embodiments described above, in addition to this, the clip 4 may have three or more clipping portions 42 and clip three or more lamps, and also the clip may have two or more clipping portions. Sliding of one clipping portion may be enabled, and also sliding of a plurality of or all the clipping portions may be enabled.

Although the two columnar mounting portions 44, 45 are provided in the embodiments described above, in addition to this, the mounting portions 44, 45 may be mounted on the supporting member 1 by a magnet for example, and a construction of the mounting portions 44, 45 is not restricted in particular.

Although the columnar projection 46 is provided, in addition to this, the columnar projection 46 is not necessarily required.

The clip 4 according to the present invention is used for the illuminant device provided with the lamps 2 which are juxtaposed at unequal intervals up and down, and also it is used for the illuminant device in which juxtaposition intervals of lamps 2 which are juxtaposed at equal intervals up and down differ depending on the model.

The invention claimed is:

1. A clip, comprising:
a plurality of clipping portions which clip a plurality of rod-shaped lamps to be juxtaposed, respectively; and
a position changing section configured to change a distance between at least two of said plurality of clipping portions.

2. An illuminant device, comprising:
a plurality of rod-shaped lamps which are juxtaposed;
a supporting member by which the lamps are supported; and
a clip defined in claim 1.

3. The illuminant device according to claim 2, wherein
said supporting member has a plurality of first mount holes provided at positions in a juxtaposition direction in which said lamps are juxtaposed, and a plurality of second mount holes provided at positions inclined with respect to said juxtaposition direction, and
said clip has a mounting portion which is inserted and fitted in one of said mount holes.

4. A clip, comprising:
a plurality of clipping portions which clip a plurality of rod-shaped lamps to be juxtaposed, respectively; and
a distance changing section capable of changing a distance between at least two of said clipping portions in a direction in which said lamps are juxtaposed.

5. A clip, comprising:
a plurality of clipping portions which clip a plurality of rod-shaped lamps to be juxtaposed, respectively; and
a flexible portion provided between at least two of said clipping portions.

6. The clip according to claim 5, wherein said flexible portion is capable of bending in a direction in which a distance between said clipping portions is changed.

7. The clip according to claim 5, wherein a plurality of said flexible portions are arranged between said clipping portions.

8. The clip according to claim 7, further comprising:
a columnar projection which extends outward exceeding said clipping portions between said flexible portions.

9. An illuminant device, comprising:
a plurality of rod-shaped lamps which are juxtaposed;
a supporting member by which the lamps are supported; and
a clip defined in claim 5.

10. An illuminant device, comprising:
a plurality of rod-shaped lamps which are juxtaposed;
a supporting member by which the lamps are supported; and
a clip defined in claim 9.

11. The illuminant device according to claim 10, wherein
said supporting member has a plurality of first mount holes provided at positions in a juxtaposition direction in which said lamps are juxtaposed, and a plurality of second mount holes provided at positions inclined with respect to said juxtaposition direction, and
said clip has a mounting portion which is inserted and fitted in one of said mount holes.

12. A clip, comprising:
a plurality of clipping portions which clip a plurality of rod-shaped lamps to be juxtaposed, respectively;
a through hole provided between at least two of said clipping portions; and
a flexible portion provided between the through hole and the clipping portion and capable of bending in a direction in which a distance between the clipping portions is changed.

13. An illuminant device, comprising:
a plurality of rod-shaped lamps which are juxtaposed;
a supporting member by which the lamps are supported; and
a clip defined in claim 12.

14. A clip, comprising:
a plurality of clipping portions provided on one face, which clip a plurality of rod-shaped lamps to be juxtaposed, respectively;
a mounting portion provided on other face, to be mounted on a supporting member by which the lamps are supported;
a flexible portion provided between at least two of said clipping portions and capable of bending in a direction in which a distance between the clipping portions is changed; and
a holding projecting portion provided at a position spaced from the flexible portion to said clipping portions side, for holding positions of said clipping portions with respect to said supporting member.

15. The clip according to claim 14, wherein a plurality of said flexible portions are arranged between said clipping portions, and said mounting portion is arranged between the flexible portions.

16. An illuminant device, comprising:
a plurality of rod-shaped lamps which are juxtaposed;
a supporting member by which the lamps are supported; and
a clip defined in claim 14.

17. A clip, comprising:
a plurality of clipping portions provided on one face, which clip a plurality of rod-shaped lamps to be juxtaposed, respectively;
a mounting portion provided on the other face, to be mounted on a supporting member by which the lamps are supported;
two groove portions provided on the other face between at least two of the clipping portions, for bending; and
a groove portion provided on said one face between the two groove portions, for bending.

18. An illuminant device, comprising:
a plurality of rod-shaped lamps which are juxtaposed;
a supporting member by which the lamps are supported; and
a clip defined in claim 17.

19. A clip, comprising:
a plurality of clipping portions which clip a plurality of rod-shaped lamps to be juxtaposed, respectively,
wherein at least one of the plurality of clipping portions is movable to change a distance between a rod-shaped lamp held by one of the plurality of clipping portions and a rod-shaped lamp held by another one of the plurality of clipping portions.

20. The clip according to claim 19, wherein said movable clipping portion is capable of sliding in a direction in which a distance between the another one of the plurality of clipping portions is changed.

21. The clip according to claim 19, further comprising:
a regulating portion which regulates rotation in a direction crossing a direction in which said movable clipping portion slides.

22. The clip according to claim 19, wherein a plurality of said movable clipping portions are juxtaposed rotatably.

23. An illuminant device, comprising:
a plurality of rod-shaped lamps which are juxtaposed;
a supporting member by which the lamps are supported; and
a clip defined in claim 19.

24. An illuminant device, comprising
a plurality of rod-shaped lamps which are juxtaposed;
a supporting member by which the lamps are supported;
a clip having a plurality of clipping portions which clip intermediate parts of the lamps,
wherein said clip has a distance changing section capable of changing a distance between at least two of said clipping portions corresponding to a juxtaposition interval of said lamps which are juxtaposed.

25. An illuminant device, comprising:
a plurality of rod-shaped lamps which are juxtaposed;
a supporting member by which the lamps are supported; and
a clip that includes,
a plurality of clipping portions which clip a plurality of rod-shaped lamps to be juxtaposed, respectively, and
a position changing section capable of changing a relative position of at least two of said clipping portions,
wherein said supporting member has a plurality of first mount holes provided at positions in a juxtaposition direction in which said lamps are juxtaposed, and a plurality of second mount holes provided at positions inclined with respect to said juxtaposition direction, and
said clip has a mounting portion which is inserted and fitted in one of said mount holes.

26. A clip, comprising:
a plurality of clipping portions which clip a plurality of rod-shaped lamps to be juxtaposed, respectively,
wherein at least one of the clipping portions is movable, and
wherein said movable clipping portion is capable of sliding in a direction in which a distance between the clipping portions is changed.

27. A clip, comprising:
a plurality of clipping portions which clip a plurality of rod-shaped lamps to be juxtaposed, respectively, at least one of the clipping portions being movable; and
a regulating portion which regulates rotation in a direction crossing a direction in which said movable clipping portion slides.

* * * * *